(12) United States Patent
Wang et al.

(10) Patent No.: US 7,985,710 B2
(45) Date of Patent: Jul. 26, 2011

(54) CATALYST FOR PRODUCTION OF SYNTHESIS GAS

(75) Inventors: Hui Wang, Saskatoon (CA); Jianguo Zhang, Saskatoon (CA); Ajay Kumar Dalai, Saskatoon (CA)

(73) Assignee: University of Saskatchewan, Saskatoon (CA)

( * ) Notice: Subject to any disclaimer, the term of this patent is extended or adjusted under 35 U.S.C. 154(b) by 0 days.

(21) Appl. No.: 12/142,517

(22) Filed: Jun. 19, 2008

(65) Prior Publication Data

US 2009/0314993 A1 Dec. 24, 2009

(51) Int. Cl.
*B01J 23/58* (2006.01)

(52) U.S. Cl. ........ 502/328; 502/324; 502/325; 502/326; 502/327; 502/332; 502/335; 502/346; 423/449.5; 423/450; 423/458; 423/449.9; 423/459

(58) Field of Classification Search .......... 502/324–328, 502/332, 335, 346; 423/449.5, 450, 458, 423/449.9, 459
See application file for complete search history.

(56) References Cited

U.S. PATENT DOCUMENTS

| | | | |
|---|---|---|---|
| 3,791,993 | A | 2/1974 | Rostrup-Nielsen |
| RE28,655 | E | 12/1975 | Rostrup-Nielsen |
| 4,024,075 | A | 5/1977 | Russ et al. |
| 4,546,091 | A | 10/1985 | Sheppard et al. |
| 5,246,899 | A | 9/1993 | Bhattacharyya |
| 5,399,537 | A | 3/1995 | Bhattacharyya et al. |
| 5,439,861 | A | 8/1995 | Bhattacharyya et al. |
| 5,591,238 | A | 1/1997 | Bhattacharyya et al. |
| 5,614,163 | A | 3/1997 | Bhattacharyya et al. |
| 5,653,774 | A | 8/1997 | Bhattacharyya et al. |
| 5,767,040 | A | 6/1998 | Bhattacharyya et al. |
| 5,939,353 | A | 8/1999 | Bhattacharyya et al. |
| 6,271,170 | B1 | 8/2001 | Suh et al. |
| 6,293,979 | B1 | 9/2001 | Choudhary et al. |
| 6,436,871 | B1* | 8/2002 | Liu ................ 502/335 |

(Continued)

FOREIGN PATENT DOCUMENTS

EP 1135327 B1 6/2004

(Continued)

OTHER PUBLICATIONS

Shiraga et al., Partial oxidation of propane to synthesis gas over noble metals-promoted Ni/Mg(AI)O catalysts-High activity of Ru-Ni/Mg(AI)I catalyst, Nov. 28, 2006, Applied Catalysis A: General, 318 143-154.*

*Primary Examiner* — Jerry Lorengo
*Assistant Examiner* — Pritesh Darji
(74) *Attorney, Agent, or Firm* — Oyen Wiggs Green & Mutala LLP

(57) ABSTRACT

The present invention relates to a novel composite metal oxide catalyst, a method of making the catalyst, and a process for producing synthesis gas using the catalyst. The catalyst may be a nickel and cobalt based dual-active component composite metal oxide catalyst. The catalyst may be used to produce synthesis gas by the carbon dioxide reforming reaction of methane. The catalyst on an anhydrous basis after calcinations has the empirical formula:

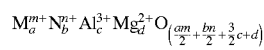

$$M_a^{m+} N_b^{n+} Al_c^{3+} Mg_d^{2+} O_{\left(\frac{am}{2}+\frac{bn}{2}+\frac{3}{2}c+d\right)}$$

$M^{m+}$ and $N^{n+}$ are two transition metals serving as dual-active components and selected from the group consisting of Ni, Co, Fe, Mn, Mo, Cu, Zn or mixtures thereof, $a+b+c+d=1$, and $0.001 \leq a \leq 0.8$, $0.001 \leq b \leq 0.8$, $0.1 \leq c \leq 0.99$, $0.01 \leq d \leq 0.99$.

24 Claims, 15 Drawing Sheets

U.S. PATENT DOCUMENTS

| | | |
|---|---|---|
| 7,468,342 B2 * | 12/2008 | Kanamori et al. ............ 502/327 |
| 2002/0177735 A1 * | 11/2002 | Kanamori et al. ............ 564/422 |
| 2003/0005633 A1 | 1/2003 | Bhattacharyya et al. |
| 2003/0045423 A1 | 3/2003 | Dindi et al. |
| 2003/0172590 A1 | 9/2003 | Bhattacharyya et al. |
| 2004/0077496 A1 | 4/2004 | Zhao et al. |
| 2004/0180786 A1 | 9/2004 | Zhao et al. |

FOREIGN PATENT DOCUMENTS

| | | |
|---|---|---|
| WO | 9414700 | 7/1994 |
| WO | 9915459 | 4/1999 |
| WO | 0125142 A1 | 4/2001 |
| WO | 0298557 A1 | 12/2002 |
| WO | 2004011138 A1 | 2/2004 |

* cited by examiner

Fig. 23. (a)-(d)

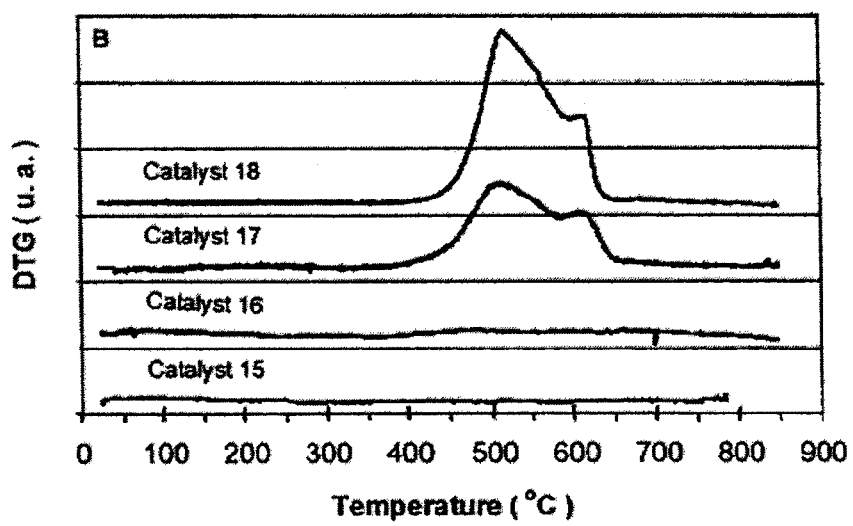
Fig. 25(b)
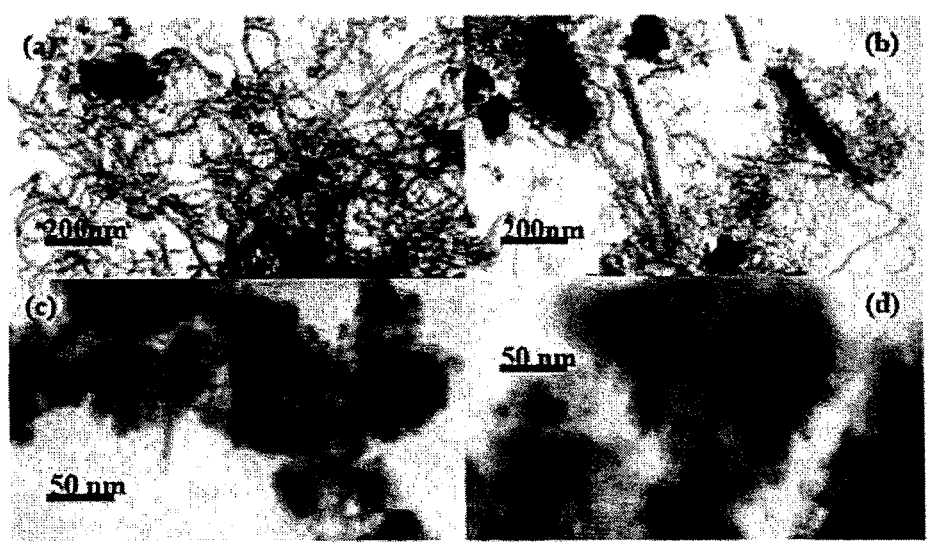
Fig 26(a)-(d)

CATALYST FOR PRODUCTION OF SYNTHESIS GAS

FIELD OF THE INVENTION

The present invention relates generally to catalysts for producing synthesis gas, and more particularly to catalysts for producing synthesis gas by carbon dioxide reforming of hydrocarbons.

BACKGROUND OF THE INVENTION

Synthesis gas is a mixture of gases including varying amounts of carbon monoxide and hydrogen. Synthesis gas may be used, for example, as an intermediate in the production of synthetic natural gas, synthetic petroleum, ammonia and methanol. Synthesis gas may be produced by carbon dioxide reforming reactions of hydrocarbons, particularly light hydrocarbons such as methane.

Synthesis gas may be produced by carbon dioxide reforming of methane according to the following reaction:

$$CH_4 + CO_2 = 2CO + 2H_2 \quad 247 \text{ kJ·mol}^{-1}$$

This reaction is highly endothermic and generally requires temperatures in the range of 600 to 1100° to drive the reaction forward. Reforming catalysts such as $Ni/Al_2O_3$, $Ni/MgO/Al_2O_3$ and the like may be used to catalyze the reaction. Reforming catalysts used in the above reaction are generally Group VIII metals held on various supports.

Problems with known reforming catalysts include severe and rapid deactivation as a result of coking, or carbon deposition on the catalyst. Often, known catalysts are expensive to produce (e.g. some noble metal catalysts) and/or have low selectivity for target products such as hydrogen and carbon monoxide. Carbon dioxide reforming of methane to produce synthesis gas has therefore yet to be established on a commercial scale.

It is desirable to provide a stable, inexpensive reforming catalyst with high catalytic activity and high selectivity for products such as hydrogen and carbon monoxide.

SUMMARY OF THE INVENTION

One aspect of the present invention provides a catalyst composition having a dual-active component composite metal oxide for production of synthesis gas. The dual-active component composite metal oxide has a chemical composition on an anhydrous basis after calcination expressed by the empirical formula:

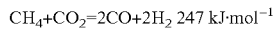

wherein $M^{m+}$ and $N^{n+}$ are two transition metals serving as dual-active components and selected from the group consisting of Ni, Co, Fe, Mn, Mo, Cu, Zn or mixtures thereof, m and n are the valences of M and N respectively and equivalent to 2 or 3, a, b, c and d are mole fractions with the proviso that a+b+c+d=1 and $0.001 \leq a \leq 0.8$, $0.001 \leq b \leq 0.8$, $0.1 \leq c \leq 0.99$, $0.01 \leq d \leq 0.99$.

Another aspect of the present invention provides a process for preparing a catalyst composition having a dual-active component composite metal oxide for production of synthesis gas. The dual-active component composite metal oxide has a chemical composition on an anhydrous basis after calcination expressed by the empirical formula:

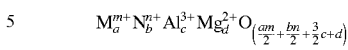

wherein $M^{m+}$ and $N^{n+}$ are two transition metals serving as dual-active components and selected from the group consisting of Ni, Co, Fe, Mn, Mo, Cu, Zn or mixtures thereof, m and n are the valences of M and N respectively and equivalent to 2 or 3, a, b, c and d are mole fractions with the proviso that a+b+c+d=1 and $0.001 \leq a \leq 0.8$. $0.001 \leq b \leq 0.8$. $0.1 \leq c \leq 0.99$, $0.01 \leq d \leq 0.99$. The process includes the steps of:
(a) dissolving water soluble metal salts comprising inorganic or organic salts of Mg, Al and two transition metals selected from the group consisting of Ni, Co, Fe, Mn, Mo, Cu, Zn and mixtures thereof;
(b) adding a basic solution of a precipitation reagent into an acidic solution of the metal salts of step to generate a precipitate;
(c) washing the precipitate;
(d) drying the precipitate;
(e) calcining the precipitate; and
(f) activating the catalyst composition before reaction in a flow stream comprising $H_2$.

A further aspect of the present invention provides a process for producing synthesis gas using a catalyst composition for reforming a hydrocarbon or biogas with an oxidant. The catalyst composition has a dual-active component composite metal oxide for production of synthesis gas. The dual-active component composite metal oxide has a chemical composition on an anhydrous basis after calcination expressed by the empirical formula:

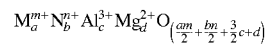

wherein $M^{m+}$ and $N^{n+}$ are two transition metals serving as dual-active components and selected from the group consisting of Ni, Co, Fe, Mn, Mo, Cu, Zn or mixtures thereof, m and n are the valences of M and N respectively and equivalent to 2 or 3, a, b, c and d are mole fractions with the proviso that a+b+c+d=1 and $0.001 \leq a \leq 0.8$, $0.001 \leq b \leq 0.8$, $0.1 \leq c \leq 0.99$, $0.01 \leq d \leq 0.99$.

BRIEF DESCRIPTION OF THE DRAWINGS

Further features and advantages of the invention will be shown by the following detailed description of the preferred embodiments of the present invention combined with the drawings in which:

FIGS. 26(a) to (d) are post-reaction TEM micrographs of certain embodiments of the present invention, namely (a) Catalyst 18; (b) Catalyst 17; (c) Catalyst 16; and (d) Catalyst 15.

DETAILED DESCRIPTION OF THE INVENTION

Figure 1:
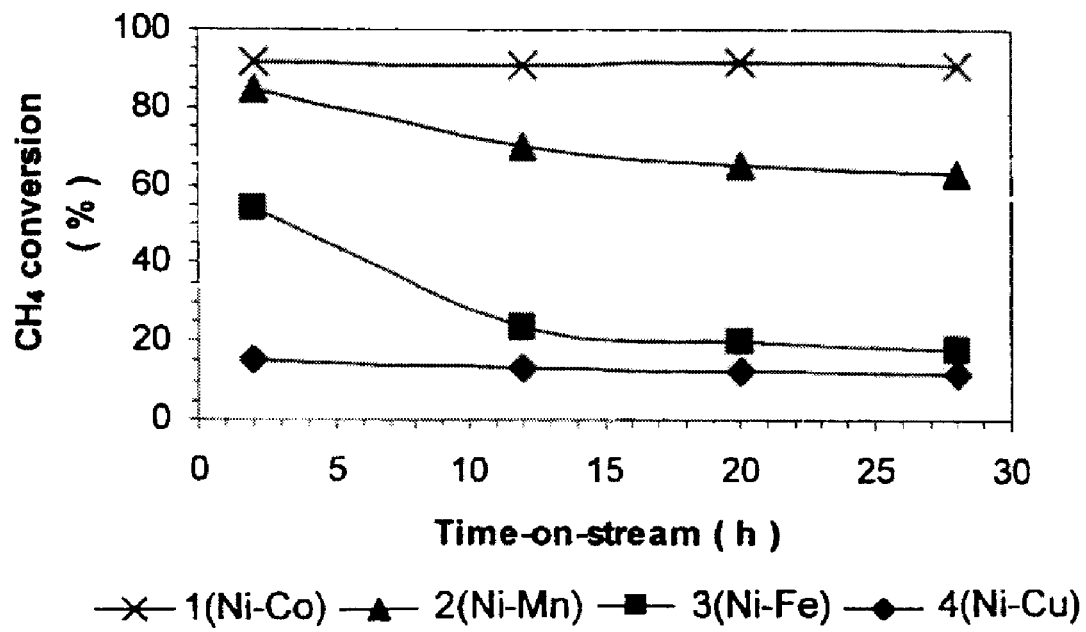
FIG. 1 is a graph showing $CH_4$ conversion as a function of time-on-stream (TOS) for a 28-h activity and stability test of certain embodiments of the present invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

In contrast to problems associated with known reforming catalysts, the present invention provides a catalyst having high activity, high stability, and high yield of synthesis gas. The term synthesis gas, as used in this specification, includes carbon monoxide, hydrogen and gas mixtures containing carbon monoxide and hydrogen.

In particular, the present invention relates to a dual-active component composite metal oxide catalyst for reforming reactions of hydrocarbons, a method of preparing the catalyst, and a process for producing synthesis gas using the catalyst. Preparation and use of the catalyst is inexpensive and simple. The terms dual-active component composite metal oxide catalyst and bimetallic catalyst are used interchangeably in this specification.

The catalyst according to one embodiment of the present invention has a chemical composition on an anhydrous basis after calcination expressed by the empirical formula:

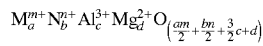

$$M_a^{m+} N_b^{n+} Al_c^{3+} Mg_d^{2+} O_{\left(\frac{am}{2}+\frac{bn}{2}+\frac{3}{2}c+d\right)}$$

where M and N are two transition metals selected from Ni, Co, Fe, Mn, Mo, Cu, Zn or mixtures thereof.

The letters "m" and "n" represent the valence of M and N, respectively, and are equivalent to 2 or 3 depending on the transition metals selected. The letters "a" "b", "c" and "d" represent mole fractions of M, N, Al and Mg, respectively, with the provisos that a+b+c+d=1.

The mole fraction of M is 0.001≦a≦0.8, preferably 0.005≦a≦0.5, and even more preferably 0.01≦a≦0.1. The mole fraction of N is 0.001≦b≦0.8, preferably 0.005≦b≦0.5, and even more preferably 0.01≦b≦0.1.

M combines with N resulting in two active components in the catalyst composition. The interaction between M and N has been discovered to improve the selectivity of the catalyst and suppresses coking. These interactions may include strong metal-support interaction (SMSI) and formation of stable solid solutions. M and N, particularly at lower molar fractions, also have a smaller metal particle size and higher dispersion to improve catalytic performance and reduce coking or carbon deposition. M may be Ni and N may be Co in certain embodiments.

The overall mole fraction of M and N is 0.001≦(a+b)≦0.8, preferably 0.005≦(a+b)≦0.5, and even more preferably 0.01≦(a+b)≦0.5. When the overall mole fraction of M and N is less than 0.005, the activity of the catalyst decreases, and when the overall mole fraction of M and N exceeds 0.8, the stability of the catalyst decreases due to coking and sintering.

The mole fraction of Al is 0.01≦c≦0.99, preferably 0.05≦c≦0.95. and even more preferably 0.05≦c≦0.9. Aluminium increases the specific area and improves the pore structure and distribution of the catalyst.

The mole fraction of Mg is 0.01≦d≦0.99, preferably 0.05≦d≦0.95. and even more preferably 0.1≦d≦0.95. The high melting point of MgO which forms during the process of calcination significantly increases the resistance of catalyst to sintering greatly. The basicity of MgO may also play a role in depressing coking.

The overall mole fraction of Mg and Al is 0.1≦(c+d)≦0.99. preferably 0.15≦(c+d)≦0.90, and even more preferably 0.2≦(c+d)≦0.90. The combination of Al and Mg results in the formation of spinel $MgAl_2O_4$ and periclase MgO after calcination in air, and serves as a support for the dual-active components M and N of the catalyst. When the overall mole fraction of magnesium and aluminium is less than 0.1, the catalyst is unstable due to severe coking and sintering. Activity of the catalyst is also poor when the overall mole fraction of magnesium and aluminium exceeds 0.99. The combination of magnesium and aluminium has two important effects on the stability and activity of the catalyst: increasing resistance to sintering at high temperature and keeping a relatively high and stable specific area and pore structure of the catalyst to increase the contact area of reaction.

Any suitable method may be used to prepare the catalyst of the present invention, including co-precipitation, impregnation, homogenous precipitation, and sol-gel. Co-precipitation and impregnation are preferred methods.

When using a co-precipitating method, one or more water soluble salts selected from nickel, cobalt, manganese, iron, molybdenum, copper, and zinc, one water soluble magnesium salt and one water soluble aluminium salt are together dissolved in water. Water soluble salts can include inorganic salts, for example, nitrates, and organic salts, for example acetates.

A precipitate is generated by adding a precipitation reagent to above mixed aqueous solution while stirring at 15 to 90° C. The precipitation reagent may be selected from $NH^{4+}$, $OH^-$, and $CO_3^{2-}$. Sodium carbonate, sodium bicarbonate, sodium oxalate, sodium hydroxide, potassium carbonate, potassium bicarbonate, potassium oxalate, potassium hydroxide, ammonium carbonate, ammonium bicarbonate, ammonia and the like might be used as the precipitation reagent. Aqueous ammonia solution is a preferred precipitation reagent.

With the addition of a precipitation reagent, a precipitate is formed comprising the above metal components in the form of hydroxides. After precipitation, and before drying the precipitate, other unnecessary ions introduced with the precipitation reagent, such as $Na^+$, $K^+$, and $Cl^-$, are removed from the precipitate by filtering and washing with distilled water.

The precipitate is then dried at 70 to 150° C. overnight. Next, the dried precipitate is calcined for 2 to 20 hours at 300 to 1300° C. in air. It is preferable to calcinate for 4 to 12 hours at 600 to 1000° C. The catalyst is a composite metal oxide at this point.

The catalyst may be crushed to 20 to 70 mesh for use. Prior to using for producing synthesis gas, the catalyst should be activated at 200 to 1000° C., preferably 500 to 900° C., for 0.5 to 50 hours in a flow stream of 5 to 70% hydrogen. The activation of the catalyst can be carried out in the reactor in which the reaction to produce synthesis gas will be performed.

The catalyst may be used to produce synthesis gas by reacting a hydrocarbon, such as methane, natural gas, petroleum gas, naphtha, heavy oil, crude oil, biogas, or the like, and their mixtures with an oxidant, for example steam, carbon dioxide or oxygen. For example, the catalyst may be used for carbon dioxide reforming of methane or natural gas.

The molar ratio between oxidant and hydrocarbon is in, the range of 0.5 to 10, preferably 1.0 to 6.0, and even more preferably 1.0 to 3.0. It is not necessary to use a large molar ratio of oxidant to hydrocarbon when using the catalyst of the present invention. Inert gas such as nitrogen may be employed as reference gas for calculation of conversion and selectivity. The molar fraction of inert gas in feed gas is in the range of 10 to 80%.

The gas hourly space velocity (GHSV, here defined as the volume flow rate at standard conditions divided by the mass of catalyst) is 2,000 to 2,000,000 $mL/g_{cat} \cdot h$, preferably 10,000 to 1,000,000 $mL/g_{cat} \cdot h$, and even more preferably 40,000 to 400,000 $mL/g_{cat} \cdot h$.

The reaction temperature is in the range of 300 to 1300° C., preferably 500 to 1100° C., and even more preferably 600 to 1000° C. The reaction pressure is in the range of 0.1 to 20 atm, preferably 1 to 10 atm, and even more preferably 1 to 5 atm.

The type of reactor that can be used can be an), suitable reactor including conventional fixed bed reactors and fluidized bed reactors.

The catalyst of the present invention is suitable primarily for dry reforming of light hydrocarbons and biogas, but may be used for other purposes such as wet reforming. For the purposes of synthesis gas production, dry reforming is preferred over wet reforming. The present invention may also be used in other contexts such as reduction of carbon dioxide emissions into the atmosphere.

The present invention is demonstrated by the specific examples below, but the invention is not limited in scope thereto.

EXAMPLE 1

Catalyst Preparation, Characterization and Testing

The catalysts described in Examples 2-7 were prepared, characterized and tested according to the procedures described in this Example 1 below.

Catalyst Preparation

Bimetallic catalysts having an Al—Mg—O framework were prepared by co-precipitating a common aqueous solution of nickel nitrate (98% purity, Lancaster Synthesis Inc.), cobalt nitrate (99% purity, Aldrich Chemical Company), magnesium nitrate (EMD Chemicals Inc.) and aluminium nitrate (EMD Chemicals Inc.). Other bimetallic catalysts were prepared by replacing cobalt nitrate with iron (III) nitrate (99% purity, Lancaster Synthesis Inc.), manganese nitrate (99.98% purity, Lancaster Synthesis Inc.), or copper (II) nitrate (99% purity, Aldrich Chemical Company). Yet other bimetallic catalysts were prepared by replacing nickel nitrate with manganese nitrate. Monometallic catalysts were prepared by coprecipitating a common aqueous solution of either nickel nitrate or cobalt nitrate with magnesium nitrate and aluminium nitrate.

The precipitations were conducted at room temperature at pH 8.5-9.5 adjusted by titrating with aqueous ammonia solution. Precipitates were filtered and washed with de-ionized water, dried in air at 120° C. overnight, calcined at 900° C. in air for 3 to 10 h, and crushed to 20~70 mesh size.

Catalyst Characterization

Bulk metal compositions was measured by inductively coupled plasma mass spectrometry (ICP-MS).

Surface metal composition was measured by X-ray photoelectron spectroscopy (XPS).

Brunauer Emmett Teller (BET) surface area, pore measurements (volume, diameter and size distribution) were measured using $N_2$ adsorption at $-196°$ C. using a Micromeritics Accelerated Surface Area and Porosimetry (ASAP) 2000 analyzer. About 0.2 g of catalyst was used for each analysis. Before analysis, samples were evacuated at 200° C. and 500 μmHg (66.6 Pa) to remove moisture and other adsorbed gases from the catalyst surface. Sample were then evacuated at 20 μmHg (2.67 Pa) before $N_2$ adsorption. Pore measurements were derived from the adsorption branch of the $N_2$ isotherm by the Barret-Joyner-Halenda method.

Metal dispersion and metal surface area were determined by CO-chemisorption using a Micromeritics ASAP 2000 analyzer. Samples were first reduced with $H_2$ at 850 to 900° C. for 4 h. Reduced samples were transferred to the sample holder of the analyzer under protection of an inert gas (He). Three steps were then carried out before CO-chemisorption: (1) evacuating the sample for 30 min. at 120° C.; (2) reducing the sample again at 450° C. for 30 min. using $H_2$; and (3) evacuating the sample again for another 30 min. at 120° C. CO-chemisorption was performed at 35° C.

X-ray powder diffraction (XRD) analysis was conducted using a Rigaku/Rotaflex Cu rotating anode X-ray diffraction instrument equipped with a generator voltage of 40 kV and tube current of 40 mA. Samples were powdered and mixed with methanol to form a mud which was loaded on the coarse side of a glass plate and placed under ambient drying conditions. Dried sample plates were loaded into the analysis chamber and scanned at a rate of 4°/min., with 2θ varying from 20 to 80°.

Reducibility was studied using temperature-programmed reduction (TPR) in a ChemBET-3000 chemisorption analyzer. Samples of about 0.1 g were heated from room temperature to 1000° C. using 3% $H_2/N_2$ at a flow rate of 30 mL/min. and a ramp rate of 5° C./min.

Carbon deposition was measured by a Perkin-Elmer Pyris Diamond Thermo-Gravimetric and Differential Thermo-Gravimetric (TG/DTG) analyzer. Spent catalyst samples were heated in a platinum sample holder from room temperature to 850 to 1000° C. at a ramp rate of 5° C./min.

A JEOL-JEM-1200EX transmission electron microscope (TEM) operating at 100 kV was used to investigate morphology of carbon deposition on spent catalysts and metal particle size distribution of fresh catalysts.

Catalyst Testing

Catalyst were tested in a benchtop fixed-bed quartz microreactor with an inner diameter of 6 mm. Reactant feed gas consisting of an equimolar mixture of $CH_4$ (99.2%, Praxair Canada Inc.), $CO_2$ (99.9%, Praxair Canada Inc.) and $N_2$ (99.9%, Praxair Canada Inc.) was introduced into the reactor at atmospheric pressure. Before testing, catalysts were activated (reduced) by an $H_2$ (99.9%, Praxair Canada Inc.) and $N_2$ mixture with a molar ratio of 1:4 to 1:9 at to 800 to 900° C. for 4 h.

Gases produced by the carbon dioxide reforming of methane were analyzed by an online Agilent 6890 GC gas chromatography equipped with thermal conductivity detection (TCD) and a GS-GASPRO capillary column (J&V Scientific Inc.) of 60 m in length and 0.32 mm in inner diameter. Helium (ultra-high purity, Praxair Canada Inc.) was used as the carrier gas. The gas chromatography oven temperature was initially held at $-60°$ C. for 3 min. and then increased to 30° C. at a ramp rate of 25° C./min.

The conversion rate of methane, selectivity of carbon monoxide, and selectivity of hydrogen are calculated according to the following equations:

$$C_{CH_4} = \frac{F^i_{CH_4} - F^i_{N_2} \times \frac{X_{CH_4}}{X_{N_2}}}{F^i_{CH_4}} \times 100\%$$

$$S_{CO} = \frac{F^i_{N_2} \times \frac{X_{CO}}{X_{N_2}}}{\left(F^i_{CH_4} - F^i_{N_2} \times \frac{X_{CH_4}}{X_{N_2}}\right) + \left(F^i_{CO_2} - F^i_{N_2} \times \frac{X_{CO_2}}{X_{N_2}}\right)} \times 100\%$$

$$S_{H_2} = \frac{F^i_{N_2} \times \frac{X_{H_2}}{X_{N_2}}}{2 \times \left(F^i_{CH_4} - F^i_{N_2} \times \frac{X_{CH_4}}{X_{N_2}}\right)} \times 100\%$$

where, $C_{CH4}$ is the overall conversion of methane, $S_{co}$ selectivity of carbon monoxide, $S_{H2}$ selectivity of hydrogen, $F^i_{CH4}$ initial volume flow rate of methane, $F^i_{CO2}$ initial volume flow rate of carbon dioxide, $F^i_{N2}$ initial volume flow rate of nitrogen, $X_{CH4}$ molar fraction of methane in the product, $X_{N2}$ molar fraction of nitrogen in the product, $X_{CO}$ molar fraction of carbon monoxide in the product, $X_{H2}$ molar fraction of hydrogen in the product.

EXAMPLE 2

28 h Test of Catalysts 1-4

Bimetallic catalysts containing Ni and one of Co, Mn, Fe and Cu were prepared by coprecipitation and designated Catalysts 1-4 respectively. Bulk metal composition, BET surface area, pore volume and average pore diameter are shown in Table 1. Catalysts 2-4 (Ni—Mn, Ni—Fe and Ni—Cu) had similar levels of BET surface area at 14-18 m²/g, while Catalyst 1 (Ni—Co) had a significantly higher BET surface area at 53.5 m²/g. Pore volume followed the order Ni—Co>>Ni—Cu>Ni—Mn>Ni—Fe while the average pore diameter followed the order Ni—Co<Ni—Fe<Ni—Mn<Ni—Cu.

TABLE 1

Bulk metal composition, BET surface area, pore volume and average pore diameter of Catalysts 1-4

| | | Bulk Metal Composition (mol %) | | | | | | BET surface area (m²/g) | Pore volume (mL/g) | Average pore diameter (nm) |
|---|---|---|---|---|---|---|---|---|---|---|
| No. | Catalyst | Ni | Co | Mn | Fe | Cu | Al | Mg | | | |
| 1 | Ni—Co | 6.1 | 9.3 | — | — | — | 28.2 | 56.4 | 53.5 | 0.160 | 10.4 |
| 2 | Ni—Mn | 6.0 | — | 9.0 | — | — | 27.8 | 57.1 | 17.2 | 0.073 | 16.9 |
| 3 | Ni—Fe | 6.5 | — | — | 7.9 | — | 29.0 | 56.6 | 17.8 | 0.056 | 12.0 |
| 4 | Ni—Cu | 6.8 | — | — | — | 6.9 | 28.6 | 57.7 | 14.7 | 0.088 | 19.6 |

Figure 2:
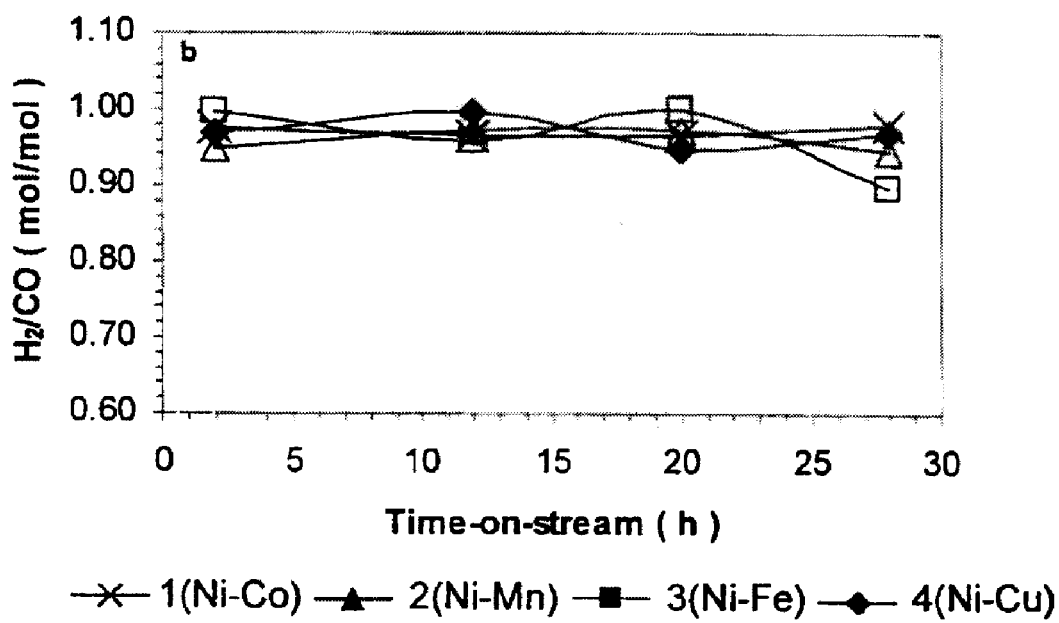
FIG. 2 is a graph showing relative $H_2$ and CO production as a function of TOS for a 28-h activity and stability test of certain embodiments of the present invention.

To screen different bimetallic combinations, activity, and stability of Catalysts 1-4 over a 28-h period was investigated. Samples were prepared by diluting 0.05 g of catalyst with 0.450 g quartz sand. Tests were run at 750° C., 1 atm, F=5.5 L/h, GHSV=110,000 mL/$g_{cat}$·h and $CH_4/CO_2/N_2$=1/1/1. $CH_4$ conversion rate as function of time-on-stream (TOS) is shown in FIG. 1. Catalyst 1 (Ni—Co) had a high initial activity (91.4% $CH_4$ conversion rate) and remained at this level throughout the 28-h testing period. Catalyst 2 (Ni—Mn) and Catalyst 3 (Ni—Fe) also had high initial activities, with $CH_4$ conversion rates of 85 and 53%, respectively; however, the conversion dropped to 63 and 18%, respectively, at the end of the 28-h testing period. Catalyst 4 (Ni—Cu) showed low but relatively stable activity, with a $CH_4$ conversion rate of <16%. Thus, initial activity followed the order Ni—Co>Ni—Mn>Ni—Fe>Ni—Cu, which is consistent with the order of BET surface area, pore volume and average pore diameter (Table 1). The ratio of $H_2$ to CO selectivity, shown in FIG. 2, reflects no obvious difference in the relative amounts of $H_2$ and CO produced when using the different bimetallic catalysts.

Figure 3:
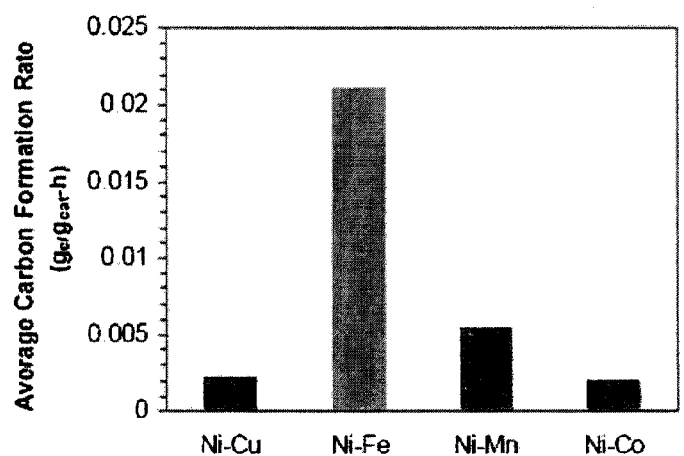
FIG. 3 is a graph showing average carbon deposition rate for a 28-h activity and stability test of certain embodiments of the present invention.

After the 28-h testing period, the amount of carbon deposited on the spent catalysts was analyzed. Average rates of carbon deposition are shown in FIG. 3. Catalyst 3 (Ni—Fe) had a high carbon deposition rate of 0.02104 $g_c/g_{cat}$-h and corresponding high activity decay of 67% (calculated on the basis of initial and final $CH_4$ conversion rates). Catalyst 2 (Ni—Mn) also had a relatively high carbon deposition rate of 0.00543 $g_c/g_{cat}$-h and corresponding activity decay of 26%. Catalyst 4 (Ni—Cu) had a lower carbon deposition rate of 0.00222 $g_c/g_{cat}$-h and an activity decay of 22%. Catalyst 1 (Ni—Co) had the lowest deposition rate, at 0.00204 $g_c/g_{cat}$-h and no activity decay over the 28-h testing period. Activity decay followed the same order as carbon deposition rate: Ni—Fe>>Ni—Mn>Ni—Cu>Ni—Co.

EXAMPLE 3

20, 200 and 2000 h Tests of Catalyst 1

Figure 4:
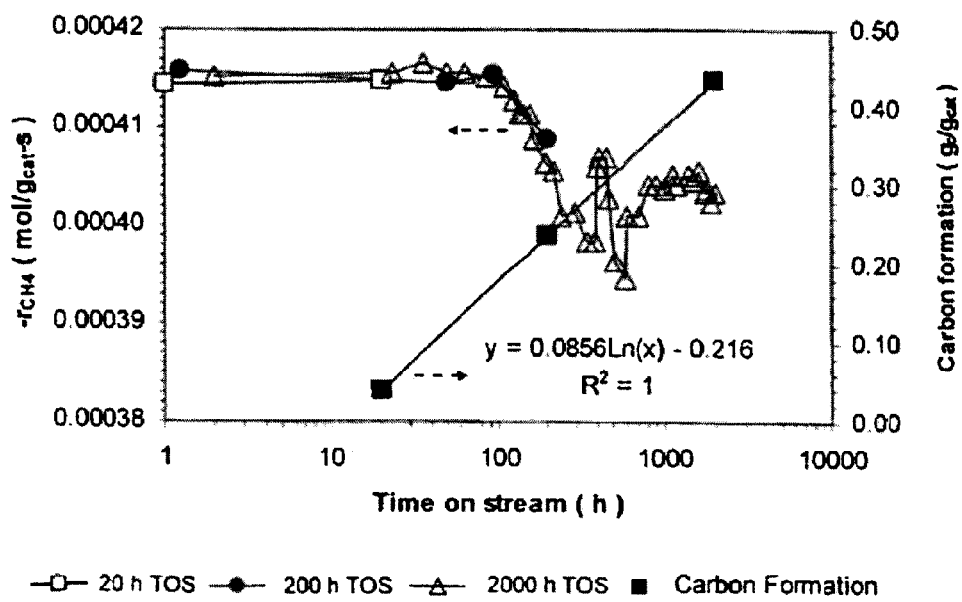
FIG. 4 is a graph showing carbon deposition and $CH_4$ conversion as a function of TOS for 20, 200 and 2000-h activity and stability tests of a certain embodiment of the present invention.

To investigate stability and carbon deposition over a longer term, Catalyst 1 (Ni—Co) was tested for 20, 200 and 2000 h, respectively. Again, samples were prepared by diluting 0.05 g of catalyst with 0.450 g quartz sand. Tests were run at 750° C., 1 atm, F=5.5 L/h, and $CH_4/CO_2/N_2$=1/1/1. $CH_4$ conversion rates and carbon deposition are shown in FIG. 4.

In the 20-h test, the $CH_4$ conversion rate was maintained at about 0.000415 mol/$g_{cat}$-s, but the amount of carbon deposited was 0.0408 $g_c/g_{cat}$. In the 200-h test, the $CH_4$ conversion rate was maintained at about 0.000416 mol/$g_{cat}$-s for 100 h but dropped to 0.000409 mol/$g_{cat}$-s at 200 h. Over the 200-h test, 0.2374 $g_c/g_{cat}$ was formed. In the 2000-h test, the $CH_4$ conversion rate again began to drop at 100 h from the initial 0.000415 to 0.000398 mol/$g_{cat}$-s at about 300 h, fluctuated between 0.000395 and 0.000407 mol/$g_{cat}$-s until 700 h, and stayed stable at 0.000404 mol/$g_{cat}$-s for the last 1300 h. The amount of carbon deposited was 0.435 $g_c/g_{cat}$ over the 2000-h period.

Carbon deposition on Catalyst 1 slowed with increasing TOS. The average carbon deposition rate was 0.00204, 0.00119, and 0.000218 $g_c/g_{cat}$-h for the 20, 200 and 2000-h tests, respectively. Further calculations relating to the 2000-h test showed the average carbon deposition rate was 0.00204 $g_c/g_{cat}$-h for first 20 period of TOS, 0.00109 $g_c/g_{cat}$-h for the following 180 h period and 0.000109 $g_c/g_{cat}$-h for the last 1800 h. Overall, decline of catalytic activity for Catalyst 1 was remarkably low at less than 3% over the 2000-h testing period.

Figure 5:
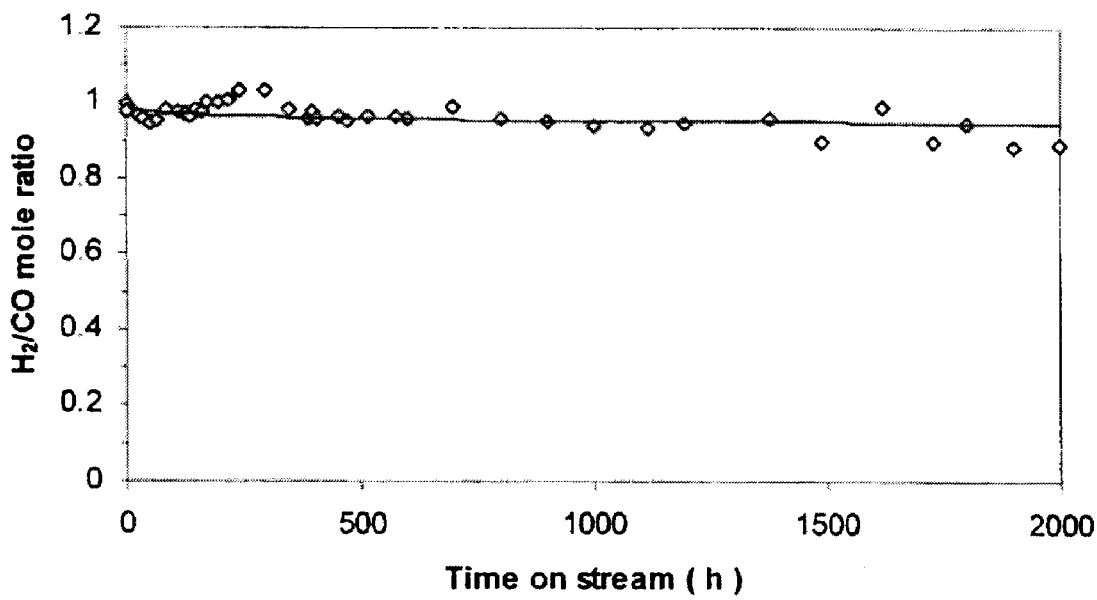
FIG. 5 is a graph showing $H_2$/CO formation as a function of TOS for 20, 200 and 2000-h activity and stability tests of certain embodiments of the present invention.

The molar ratio of $H_2$/CO as a function of TOS is shown in FIG. 5. Reverse water-gas shift reaction (RWSR) is typically a significant reaction and reduces the $H_2$/CO ratio in dry reforming of methane: however, the average $H_2$/CO ratio over the 2000-h testing period for Catalyst 1 was about 0.965, indicating the occurrence of some RWSR but of less significance than expected. The molar ratio of $H_2$ to CO oscillated between 0.9 and 1.1 during the reaction period, suggesting a periodic cycle of carbon deposition and elimination on the catalyst surface leading to stable catalytic performance.

EXAMPLE 4

250 h Test of Catalysts 1 and 5

A Ni—Co bimetallic catalyst containing about half of the Ni and Co loading of Catalyst 1 was prepared by coprecipitation. This catalyst was designated Catalyst 5. The bulk metal composition of Catalyst 5 (and Catalyst 1 for comparison) is shown in Table 2.

TABLE 2

Bulk metal composition and surface metal composition of Catalysts 1 and 5.

| | | Bulk Metal Composition (mol %) | | | |
| --- | --- | --- | --- | --- | --- |
| No. | Catalyst | Ni | Co | Al | Mg |
| 1 | Ni—Co | 6.1 | 9.3 | 28.2 | 56.4 |
| 5 | Ni—Co | 3.6 | 4.9 | 30.0 | 61.5 |

Figure 6:
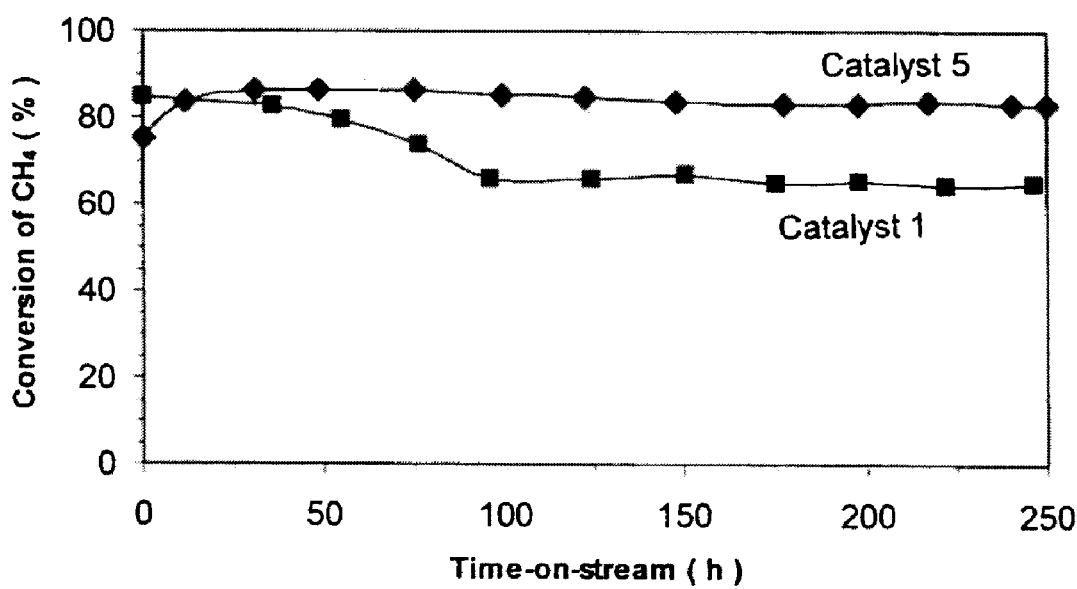
FIG. 6 is a graph showing CH$_4$ conversion as a function of TOS for a 250-h activity and stability tests of certain embodiments of the present invention.

Activity and stability of Catalysts 1 and 5 over a 250-h period was investigated. Samples were prepared by diluting 0.03 g of catalyst with 0.470 g of quartz sand. Tests were run at 750° C., 1 atm, F=5.5 L/h, and $CH_4/CO_2/N_2$=1/1/1. $CH_4$ conversion rate as function of TOS is shown in FIG. 6. The initial $CH_4$ conversion rate of Catalyst 5 was slightly lower than that of Catalyst 1. However, the $CH_4$ conversion rate of Catalyst 5 surpassed that of Catalyst 1 at an early point and remained at a high level to the end of the 250-h testing period.

Figure 7A:
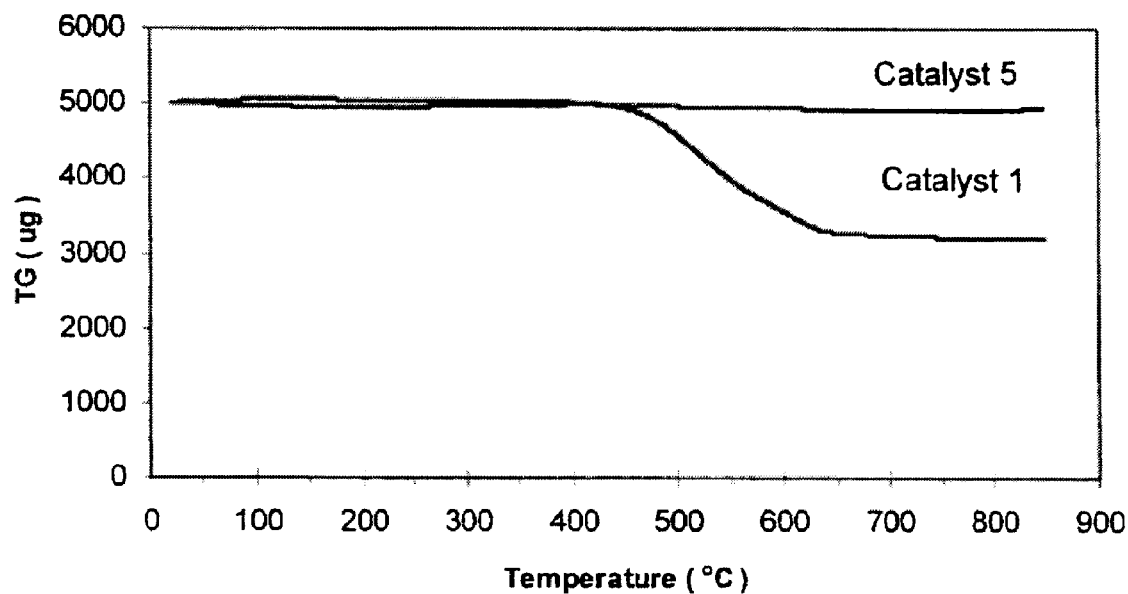
FIGS. 7(a) and (b) are graphs, for a 250-h activity and stability tests of certain embodiments of the present invention, (a) showing thermo-gravimetric (TG) profiles of spent catalysts: and (b) showing differential thermo-gravimetric (DTG) profiles of spent catalysts
Figure 7B:
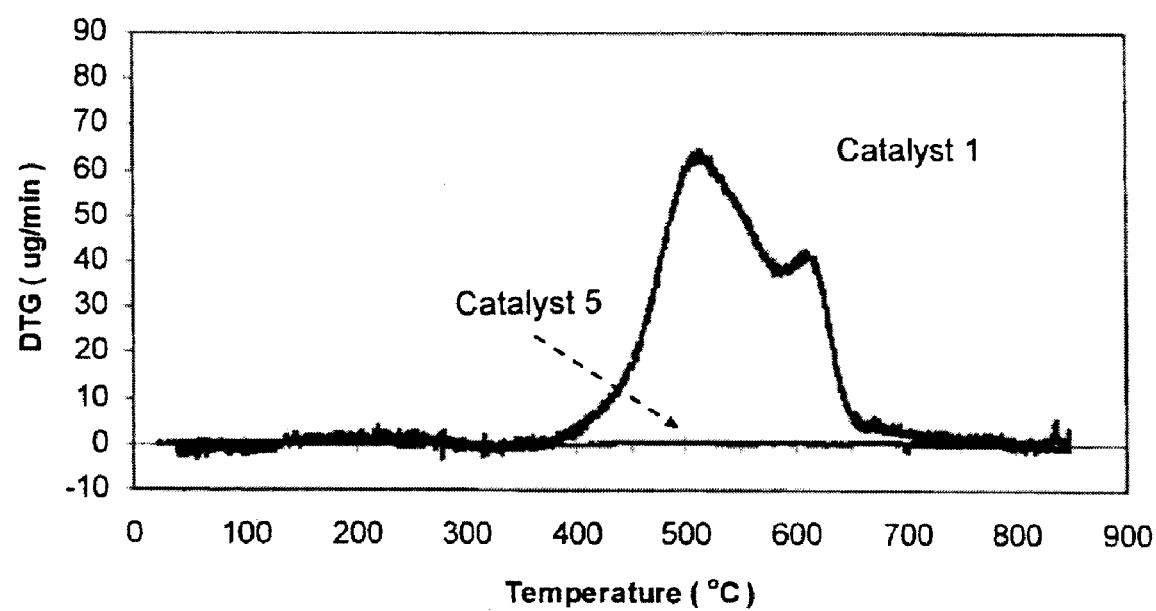

Thermo-gravimetric (TG) and differential thermo-gravimetric (DTG) analysis on the spent Catalysts 1 and 5 detected no carbon deposition on Catalyst 5 but some carbon deposition on Catalyst 1 (FIG. 7(a) and FIG. 7(b)). TEM analysis (FIG. 8(a)) further confirmed that no carbon formed on spent Catalyst 5. FIG. 7(b) shows that there were two kinds of carbon formed on Catalyst 1; one oxidizable in air at 500° C. and another oxidizable in air at 600° C. Corresponding FIG. 8(d) shows filamentous carbons of nanotubes with two very different diameters formed on Catalyst 1. The nanotubes of different diameters may be responsible for the two DTG peaks.

Figure 8A:
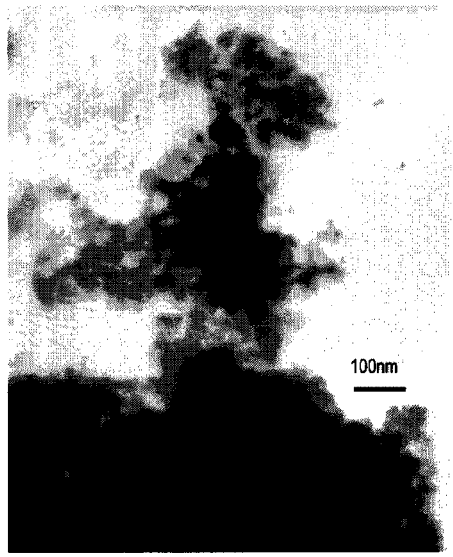
FIGS. 8(a) to (d) are transmission electron microscopy (TEM) micrographs of catalysts before and after a 250-h testing period for a 250-h activity and stability test of certain embodiments of the present invention, namely (a) Catalyst 5 before reaction; (b) Catalyst 1 before reaction; (c) Catalyst 5 after reaction; and (d) Catalyst 1 after reaction.
Figure 8B:
Figure 8C:
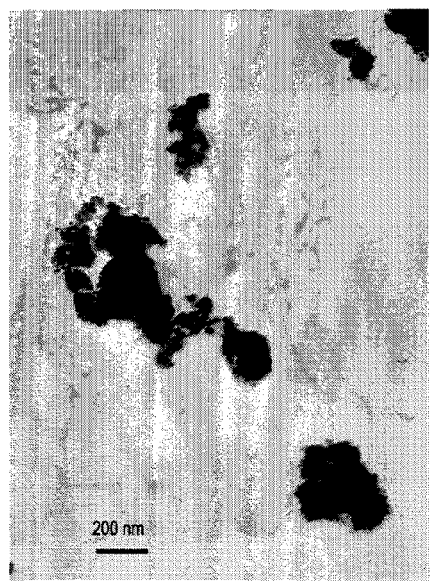
Figure 8D:
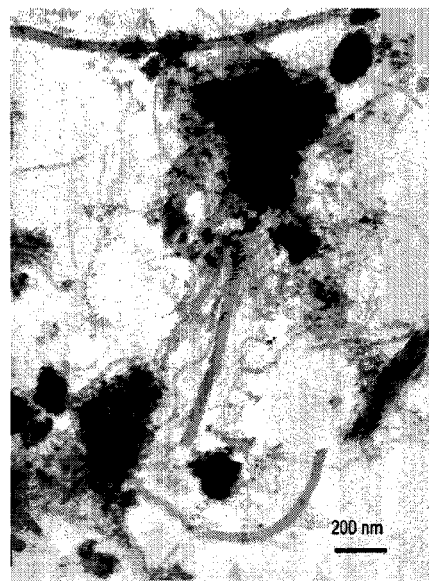

FIG. 8(a) and FIG. 8(b) show that particle size is smaller on Catalyst 5 compared to Catalyst 1. Metallic surface area and metal dispersion of Catalysts 1 and 5 are shown in Table 3. For Catalyst 1, metallic surface area was 4.1 m²/g and metal dispersion was 7.5%. Catalyst 5 had a lower metallic surface area of 2.9 m²/g but higher metal dispersion of 8.8%. The higher metallic surface of Catalyst 1 likely accounted for the higher initial activity (FIG. 6). However, its lower metal dispersion and thus larger ensembles may have resulted in relatively rapid carbon deposition and hence activity decay (FIG.

6 and FIG. 7). Carbon resistance of Catalyst 5 may be due to its higher metal dispersion and smaller metal ensembles.

TABLE 3

BET surface area, average pore diameter, metallic surface area and metal dispersion of Catalysts 1, and 5-7

| No. | Catalyst | BET surface area ($m^2/g$) | Average pore diameter (nm) | Metallic surface area ($m^2/g$) | Metal dispersion (%) |
|---|---|---|---|---|---|
| 1 | Ni—Co | 54 | 10.4 | 4.1 | 7.5 |
| 5 | Ni—Co | 56 | 8.5 | 2.9 | 8.8 |
| 6 | Ni | 45 | 9.0 | 1.2 | 2.9 |
| 7 | Co | 24 | 10.5 | 1.5 | 2.1 |

EXAMPLE 5

28 h Test of Catalysts 5-7

Comparative investigations were carried out on Ni and Co monometallic catalysts and a Ni—Co bimetallic catalyst specifically Catalyst 5. In the monometallic catalysts Ni content or Co content was at roughly the same level as the overall Ni and Co content in Catalyst 5 so that the comparison of catalytic performance could be made on the basis of similar total active metal content. The Ni monometallic catalyst was designated Catalyst 6 and the Co monometallic catalyst was designated Catalyst 7.

Bulk metal composition and surface metal composition of Catalysts 5-7 are shown in Table 4. Comparison of surface composition and bulk composition indicated that $Ni_{surface}/Ni_{bulk}$ was 1.10 in monometallic Catalyst 6 and 1.19 in bimetallic Catalyst 5. $Co_{surface}/Co_{bulk}$ was 0.80 and 1.27 in monometallic Catalyst 7 and bimetallic Catalyst 5, respectively. Surface enrichment of Ni and Co (particularly Co) was therefore evident in bimetallic Catalyst 5.

TABLE 4

Bulk metal composition and surface metal composition of Catalysts 5-7

| | | Bulk Metal Composition (mol %) | | | | Surface Metal Composition (mol %) | | | |
|---|---|---|---|---|---|---|---|---|---|
| No. | Catalyst | Ni | Co | Al | Mg | Ni | Co | Al | Mg |
| 5 | Ni—Co | 3.6 | 4.9 | 30.0 | 61.5 | 4.3 | 6.1 | 29.3 | 60.2 |
| 6 | Ni | 6.8 | — | 27.8 | 65.4 | 7.1 | — | 28.9 | 64.0 |
| 7 | Co | — | 9.7 | 30.0 | 61.5 | — | 7.8 | 31.2 | 61.0 |

Figure 9:
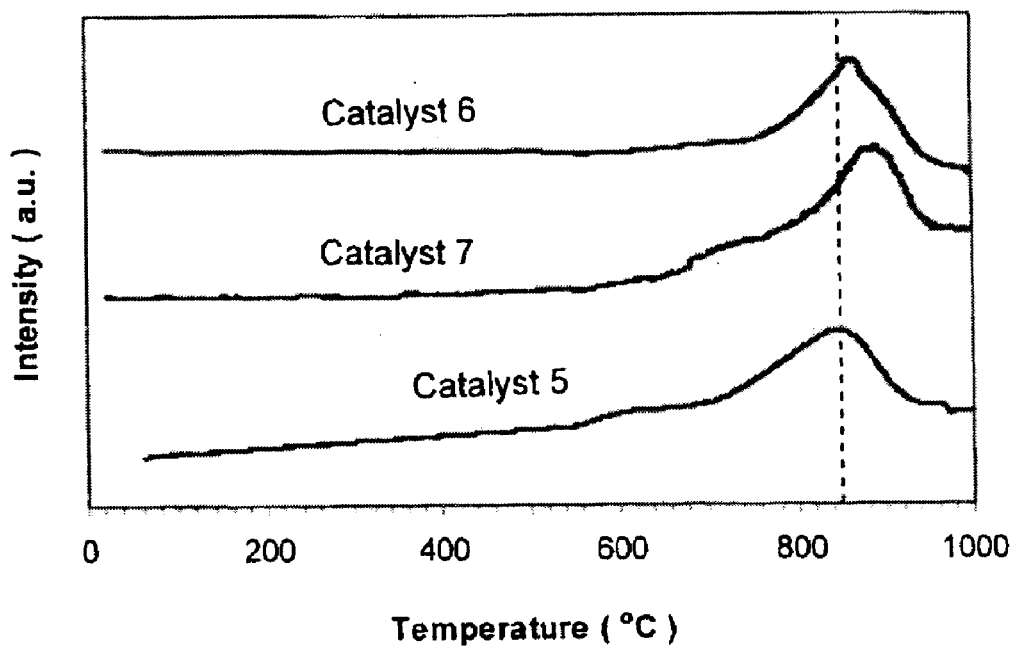
FIG. 9 is a graph showing temperature-programmed reduction (TPR) profiles of certain embodiments of the present invention.

TPR profiles of the reducibility of Catalysts 5-7 (unreduced calcine precipitates) are shown in FIG. 9. The reduction peaks in the range of 750 to 950° C. and for monometallic Catalyst 6 may indicate reduction of Ni in a mixed spinel phase $Ni_xMg_{1-x}Al_2O_4$. The reduction peaks in the range of 700 to 950° C. for monometallic Catalyst 7 may indicate reduction of Co in a mixed spinel phase $Co_xMg_{1-x}Al_2O_4$. The reduction peak in bimetallic Catalyst 5 in the range of 700 to 940° C. may have resulted from the reduction of Ni and Co in a complex quaternary spinel-like phase. In the high-temperature calcination process, Ni and Co may form a continuous row of $Ni_xCo_{3-x}O_4$ spinels, x>0. The reduction peak maximum of bimetallic Catalyst 5 was at a temperature (850° C.) lower than those for Ni monometallic Catalyst 6 (868° C.) and Co monometallic Catalyst 7 (896° C.). This may be attributable to the surface enrichment of Ni and Co in Catalyst 5 because of the greater accessibility of Ni or Co on the catalyst surface. Also, the reduction of Catalyst 5 appeared as a single reduction peak, which may indicate the formation of the Ni—Co alloy during reduction.

Figure 10:
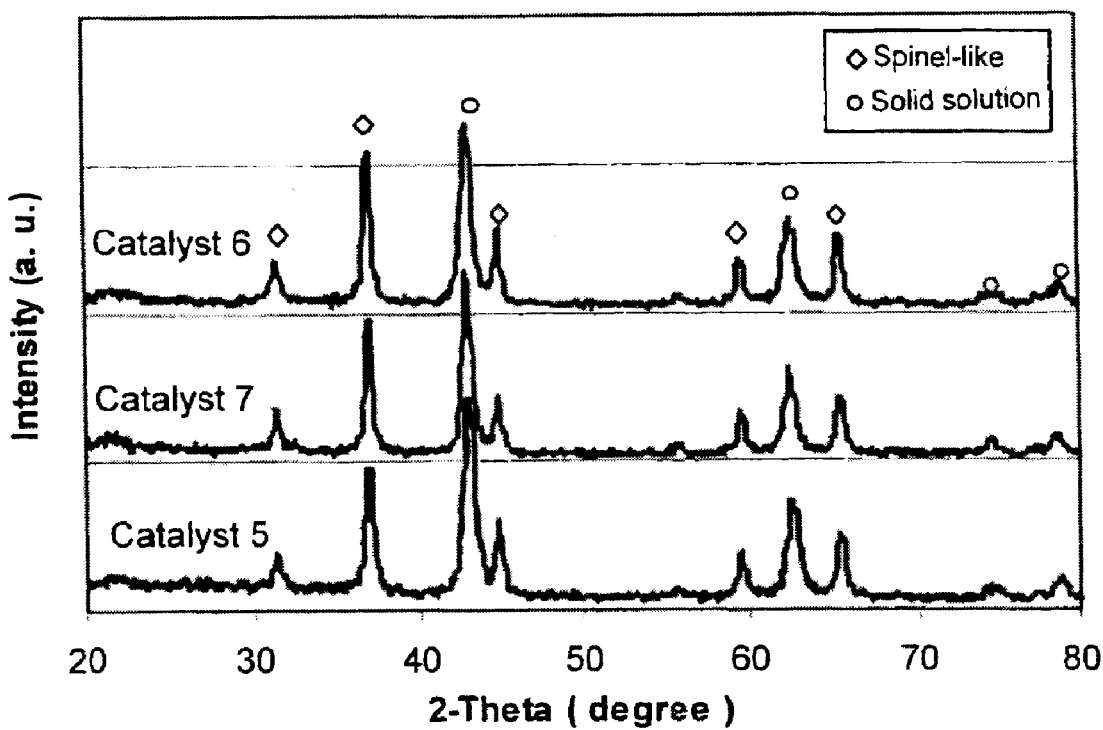
FIG. 10 is a graph showing X-ray powder diffraction (XRD) profiles of certain embodiments of the present invention.

XRD analyses of the phase structure of Catalysts 5-7 (unreduced calcined precipitates) are shown in FIG. 10. No apparent difference was revealed between the XRD patterns of Catalysts 5-7. Spinel-like phases and solid solution phases were observed in all three samples. In particular, spinel-like phases with characteristic diffraction peaks at 2θ of 30.7°, 36.8°, 44.4°, 59.8°, and 65.2°, and solid solution phase peaks at 2θ of 41.5° and 61.2°, were observed in all samples. The spinel-like phases may be $Ni_xMg_{1-x}Al_2O_4$, $Co_xMg_{1-x}Al_2O_4$, or their composites, which are indistinguishable in XRD due to their similar morphology. The solid solutions may be Ni—Mg—O and Co—Mg—O. XRD analyses showed that all the high-temperature calcined samples were well-crystallized.

Figures 11A, 11B:
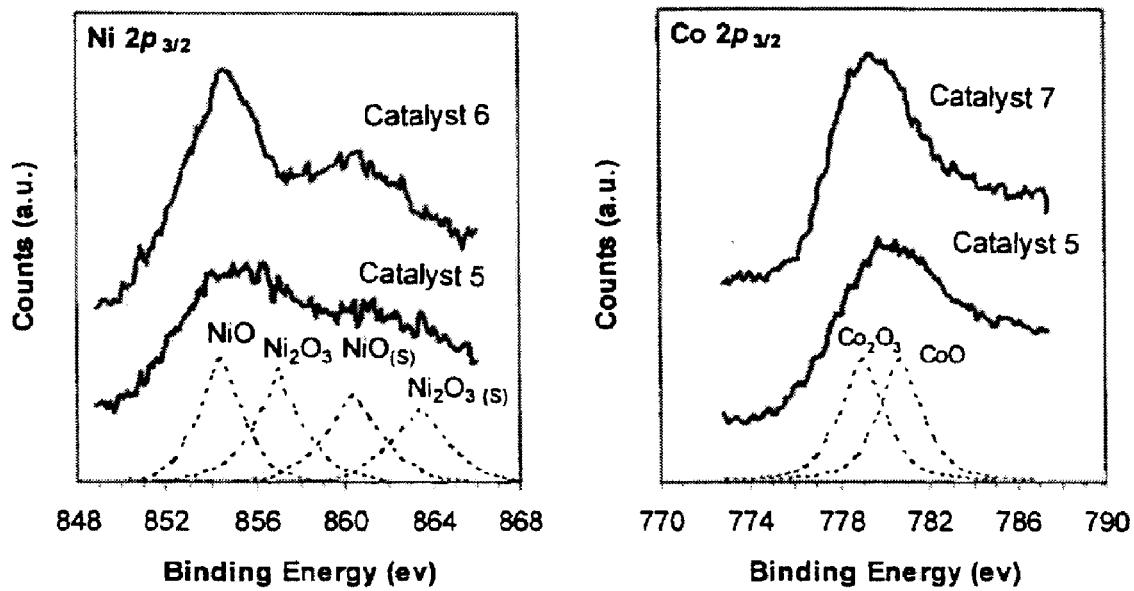
FIGS. 11(a) and (b) are X-ray photoelectron spectroscopy (XPS) Ni 2p$_{3/2}$ and Co 2p$_{3/2}$ spectra of certain embodiments of the present invention.

XPS analyses of the oxidation states of surface Ni and Co in Catalysts 5-7 are shown in FIG. 11(a) and FIG. 11(b). $Ni^{2+}$ (854 eV and 860 eV) was predominant in the Ni monometallic Catalyst 6 while $Co^{3+}$ (777 eV) was predominant in the Co monometallic Catalyst 7. Other oxidation states for both metals such as $Ni^{3+}$ and $Co^{2+}$ were increased in bimetallic Catalyst 5. Notably, part of the Ni shifted from a lower to a higher oxidation state and part of the Co shifted from a higher to a lower oxidation state. This indicates electron transfer between Ni and Co in bimetallic Catalyst 5, which suggests these metals are protected from oxidation during the reaction. It further confirms the near-distance interaction between Ni and Co atoms, which may easily form Ni—Co alloy on the bimetallic catalyst surface during reduction.

Figure 12:
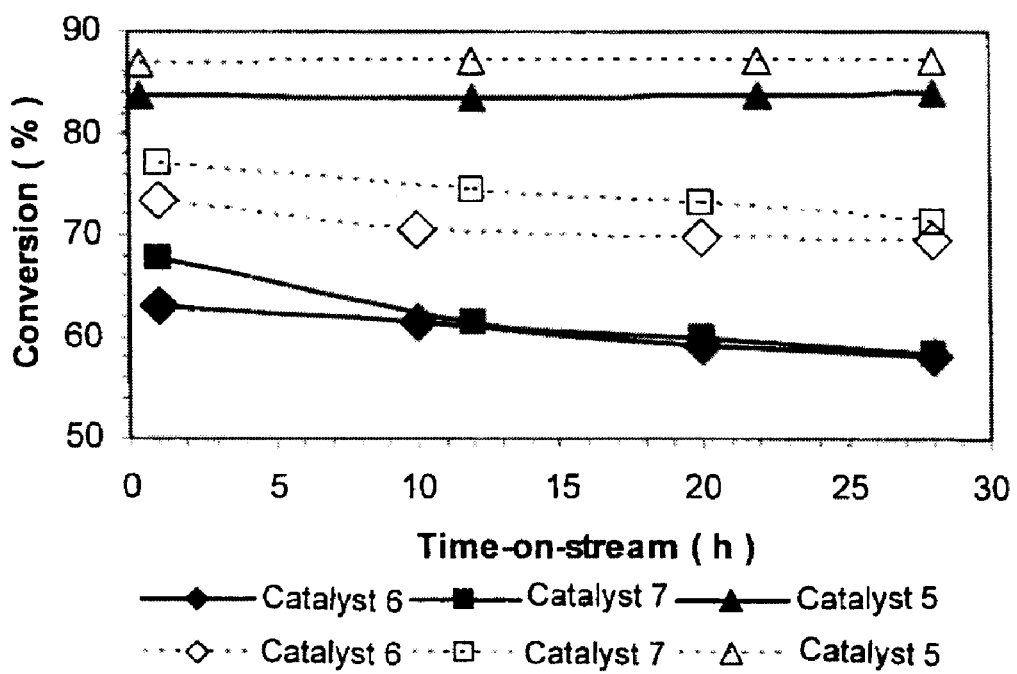
FIG. 12 is a graph showing CH$_4$ conversion as a function of TOS in solid lines and CO$_2$ conversion as a function of TOS in dotted lines for a 28-h activity and stability tests of certain embodiments of the present invention.

Table 5 and FIG. 12 show the test results of monometallic Catalysts 6 and 7 and bimetallic Catalyst 5 over a 28-h period. Samples were prepared by diluting 0.025 g of catalyst with 0.475 g quartz sand. Tests were run at 750° C., 1 atm, F=5.5 L/h, and $CH_4/CO_2/N_2$=1/1/1. Catalyst activity in terms of $CH_4$ conversion rate (solid line) and $CO_2$ conversion rate (dotted line) as functions of TOS is shown in FIG. 12. Significant difference did not appear in either activity or carbon deposition of monometallic Catalysts 6 and 7. Bimetallic Catalyst 5, on the other hand, had significantly higher activity and no detectable carbon deposition.

TABLE 5

Activity and carbon deposition rate of Catalysts 5-7

| | | Initial conversion (%) | | Final conversion (%) | | Average carbon deposition rate |
|---|---|---|---|---|---|---|
| No. | Catalyst | $CH_4$ | $CO_2$ | $CH_4$ | $CO_2$ | ($g_c/g_{cat}$-h) |
| 5 | Ni—Co | 83.8 | 87.0 | 83.9 | 87.1 | 0 |
| 6 | Ni | 62.9 | 73.4 | 58.0 | 69.5 | 0.003186 |
| 7 | Co | 67.6 | 77.0 | 58.3 | 71.2 | 0.003973 |

EXAMPLE 6

2000 h Test of Catalyst 8 and 1 h Test of Catalysts 9-14

Ni—Co, Ni—Mn, Ni—Cu and Co—Mn bimetallic catalysts were prepared by coprecipitation and designated Catalysts 8-14 respectively. Bulk metal compositions of the catalysts are shown in Table 6.

Activity of Catalyst 8 (same as Catalyst 1 in terms of composition) was tested over a 2000-h period, and Catalysts 9-14 were tested over a 1-h period. Catalyst 12 was the same as Catalyst 2 in terms of composition. Samples were prepared by diluting catalyst with quartz sand. Tests were run at 750° C., 1 atm, F=5.5 L/h, and $CH_4/CO_2/N_2$=1/1/1. Initial $CH_4$ conversion, initial $H_2$ selectivity and initial CO selectivity, all determined at t=0.5 h, are shown in Table 6.

TABLE 6

Bulk metal composition, conversion of $CH_4$, $H_2$ selectivity and CO selectivity of Catalysts 8-14

| No. | Catalyst | Bulk Metal Composition (mol %) | | | | | | Initial conversion of $CH_4$ (%) | Initial $H_2$ selectivity (%) | Initial CO selectivity (%) |
| --- | --- | --- | --- | --- | --- | --- | --- | --- | --- | --- |
| | | Ni | Co | Mn | Cu | Al | Mg | | | |
| 8 | Ni—Co | 6 | 9 | — | — | 28 | 57 | 91.5 | 97.1 | 99.8 |
| 9 | Ni—Co | 4 | 5 | — | — | 30 | 61 | 91.9 | 96.6 | 99.7 |
| 10 | Ni—Co | 25 | 9 | — | — | 26 | 40 | 92.9 | 96.0 | 98.0 |
| 11 | Ni—Co | 6 | 27 | — | — | 26 | 31 | 90.1 | 95.0 | 95.0 |
| 12 | Ni—Mn | 6 | — | 9 | — | 28 | 57 | 85.0 | 92.8 | 97.5 |
| 13 | Ni—Cu | 6 | — | — | 6 | 30 | 58 | 53.9 | 82.5 | 92.5 |
| 14 | Co—Mn | 9 | — | 9 | — | 26 | 56 | 35.5 | 81.1 | 97.2 |

Figure 13:
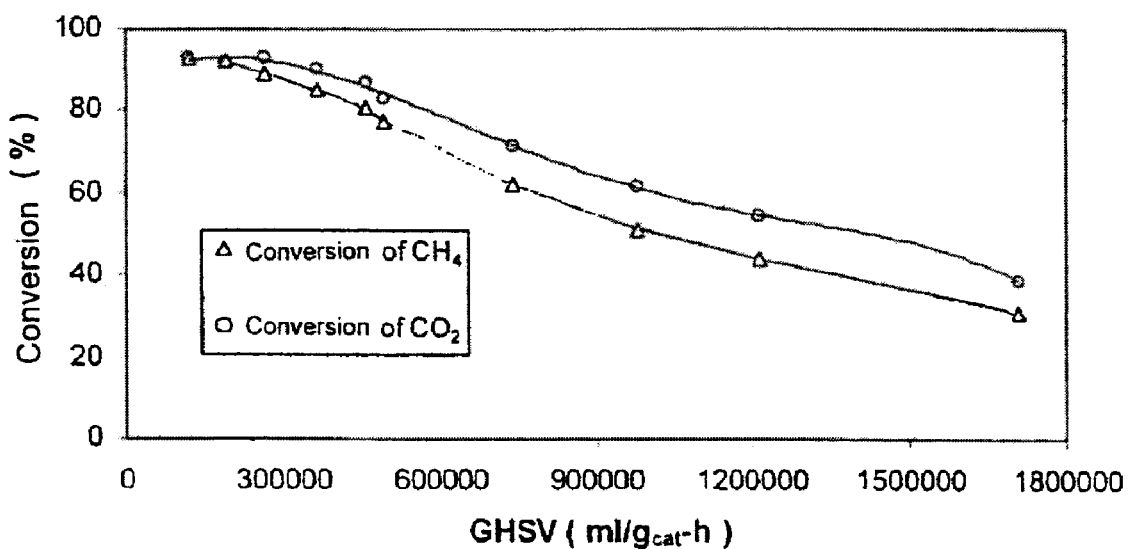
FIG. 13 is a graph showing CH$_4$ conversion and CO$_2$ conversion as functions of gas hourly space velocity (GHSV) for activity and stability tests of a certain embodiment of the present invention.
Figure 14:
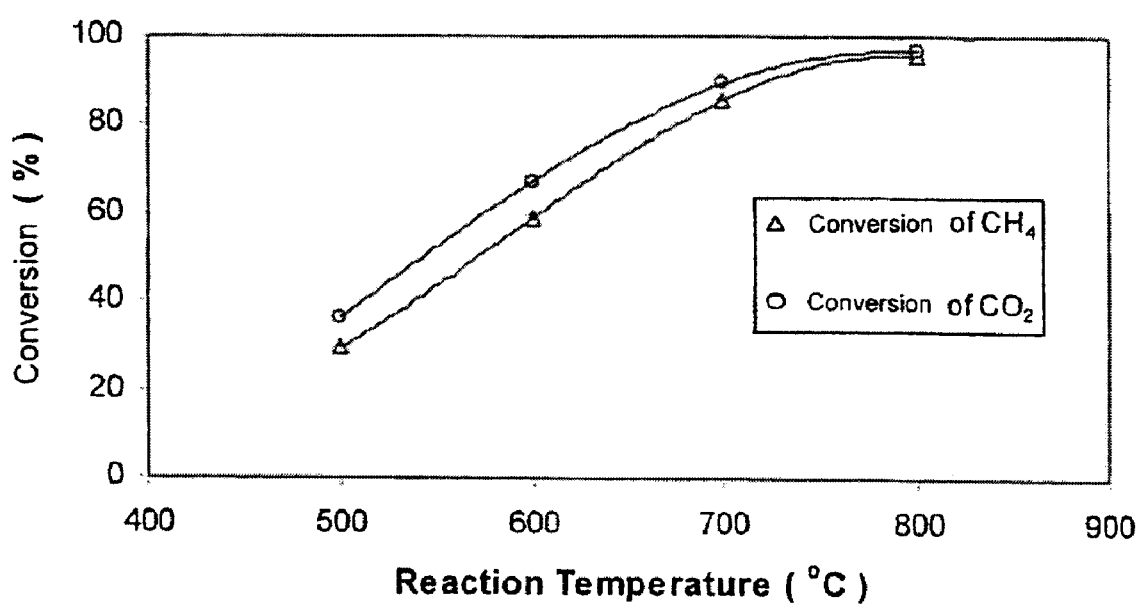
FIG. 14 is a graph showing CH$_4$ conversion and CO$_2$ conversion as functions of reaction temperature for activity and stability tests of a certain embodiment of the present invention.
Figure 15:
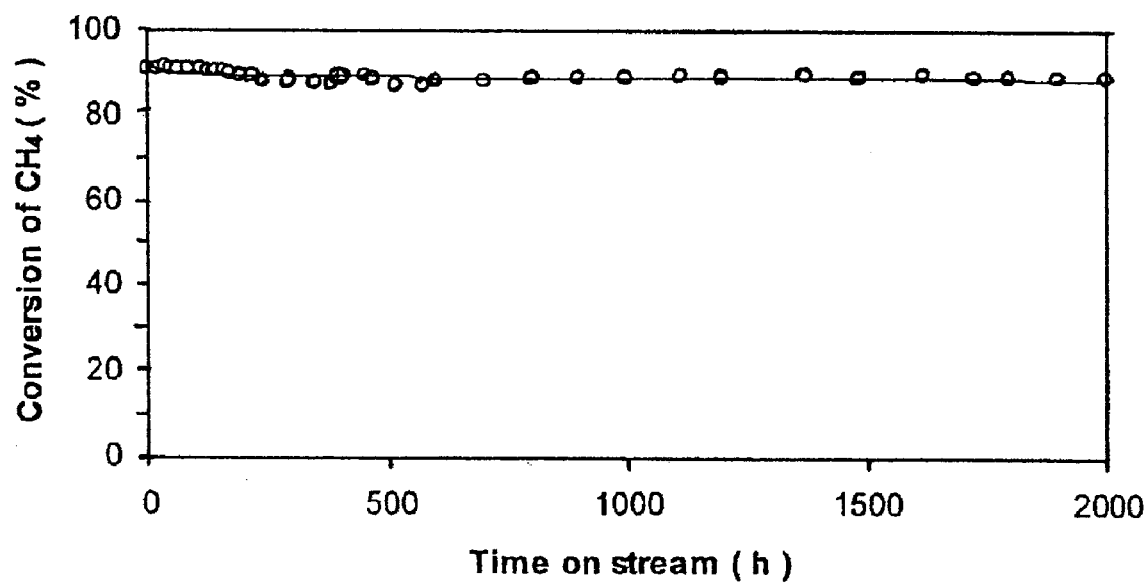
FIG. 15 is a graph showing CH$_4$ conversion as a function of TOS for a 2000-h activity and stability test of a certain embodiment of the present invention.
Figure 16:
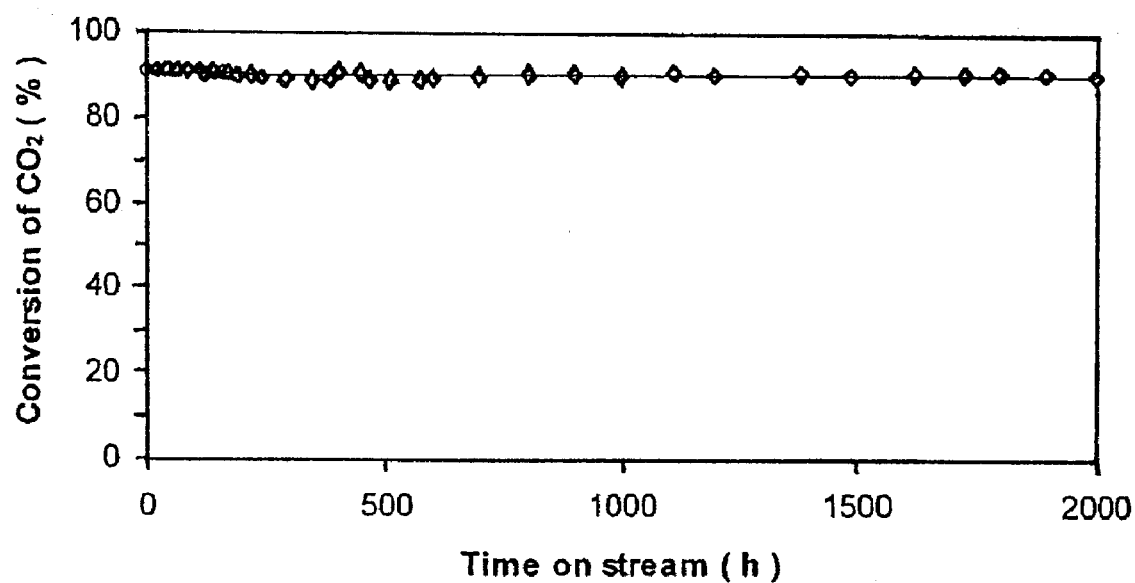
FIG. 16 is a graph showing CO$_2$ conversion as a function of TOS for a 2000-h activity and stability test of a certain embodiment of the present invention.
Figure 17:
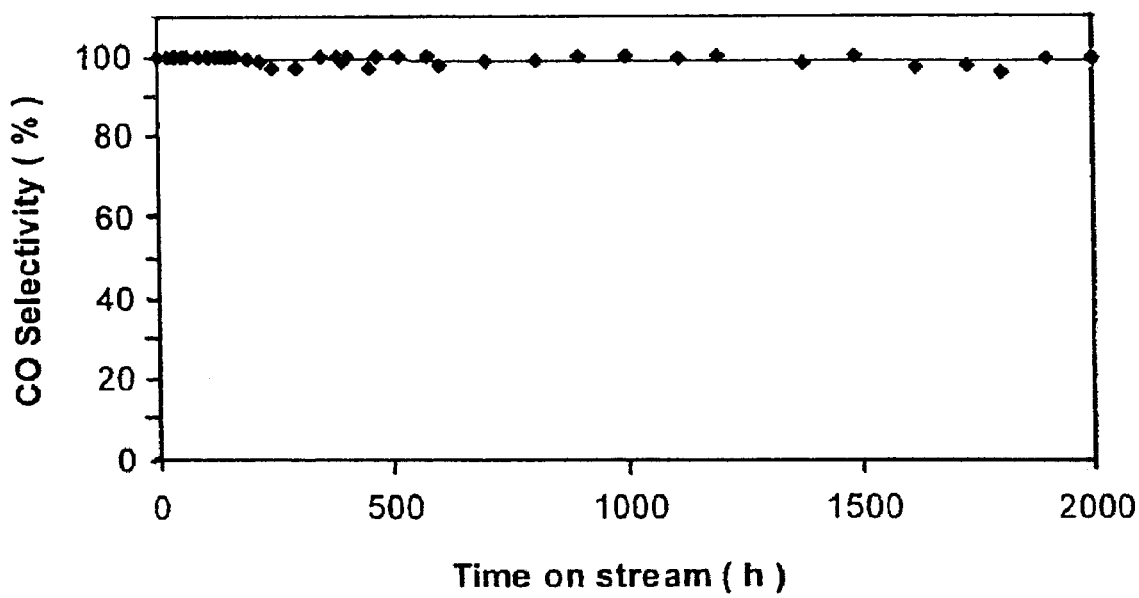
FIG. 17 is a graph showing CO selectivity as a function of TOS for a 2000-h activity and stability test of a certain embodiment of the present invention.
Figure 18:
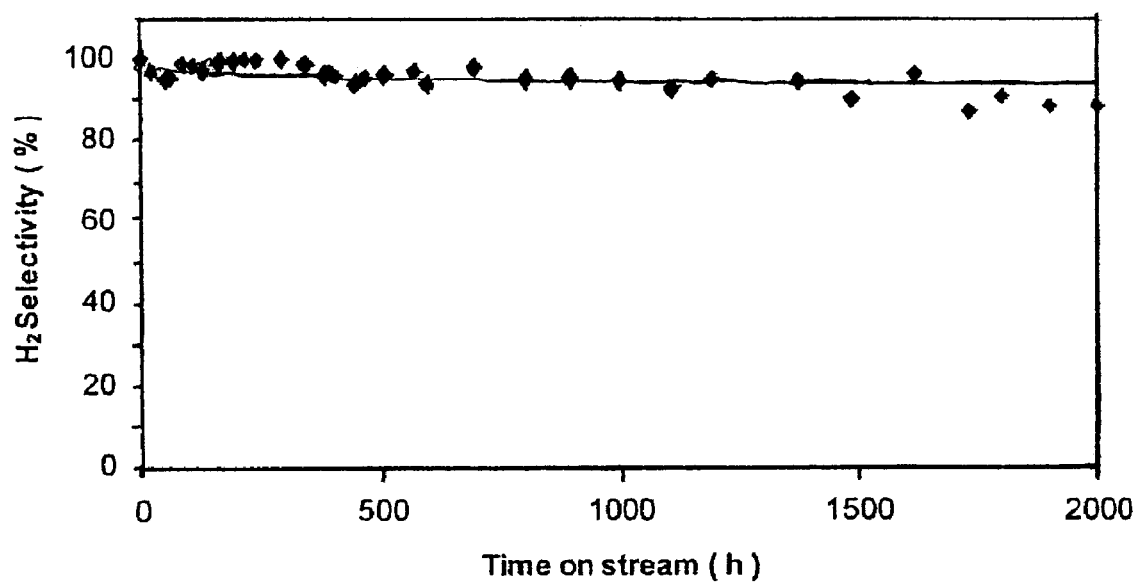
FIG. 18 is a graph showing H$_2$ selectivity as a function of TOS for a 2000-h activity and stability test of a certain embodiment of the present invention.

FIG. 13 shows the activity of Catalyst 8 in terms of the $CH_4$ conversion and $CO_2$ conversion as a function of GHSV. FIG. 14 shows the activity of Catalyst 8 in terms of the $CH_4$ conversion and $CO_2$ conversion as a function of reaction temperature. FIGS. 15 and 16 show the high stability of Catalyst 8 in terms of the $CH_4$ conversion and $CO_2$ conversion, respectively, as a function of TOS. FIGS. 17 and 18 show the CO selectivity and $H_2$ selectivity of Catalyst 8 as functions of TOS. As shown in Table 6, the selectivity of these target products is 95% or greater for all four Ni—Co containing catalysts (Catalysts 8-11).

EXAMPLE 7

250 h Test of Catalysts 15-18

Figure 19:
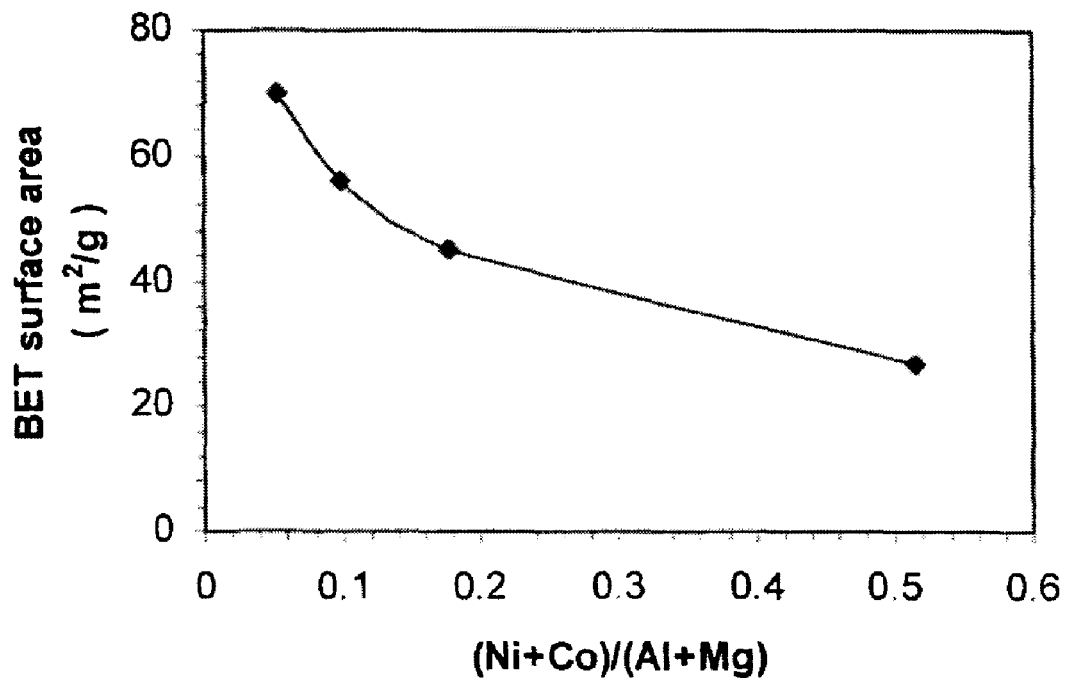
FIG. 19 is a graph showing variation of the BET surface area with (Ni+Co)/(Al+Mg) ratio for certain embodiments of the present invention.

Ni—Co bimetallic catalysts with varying Ni and Co content was prepared by coprecipitation. The catalysts were designated Catalysts 15-18. Bulk metal compositions, BET surface area and metal dispersion of Catalysts 15-18 are shown in Table 7. Surface area was inversely related to Ni and Co content (Table 7 and FIG. 19). The decrease of BET surface area with the decrease of Al—Mg content provides evidence of the stabilizing role of Al and Mg in the catalysts. Metal dispersion was also inversely related to Ni and Co content.

TABLE 7

Bulk metal composition and BET surface area of Catalysts 15-18

| No. | Catalyst | Bulk Metal Composition (mol %) | | | | BET surface area (m²/g) | Metal dispersion (%) |
| --- | --- | --- | --- | --- | --- | --- | --- |
| | | Ni | Co | Al | Mg | | |
| 15 | Ni—Co | 2 | 3 | 32 | 63 | 70 | 11.6 |
| 16 | Ni—Co | 4 | 5 | 30 | 61 | 56 | 10.9 |
| 17 | Ni—Co | 6 | 9 | 28 | 57 | 45 | 9.7 |
| 18 | Ni—Co | 18 | 16 | 26 | 40 | 27 | 9.4 |

Figure 20:
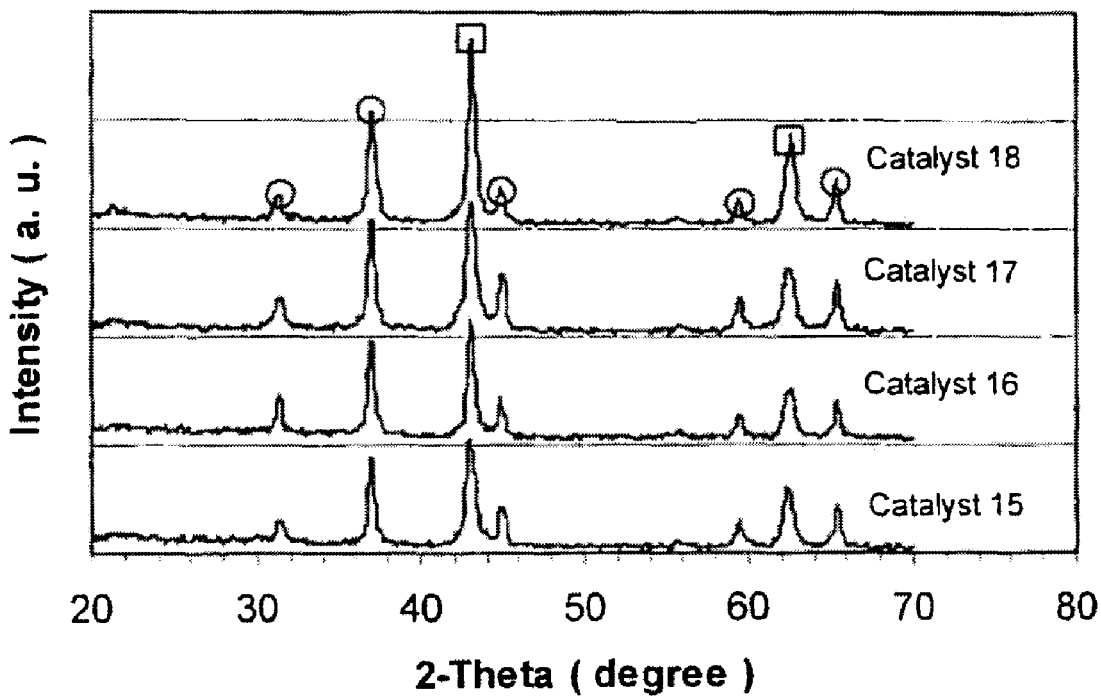
FIG. 20 is a graph showing XRD profiles of certain embodiments of the present invention (○ denoting spinel-like structures and □ denoting solid solutions)

XRD analyses of the phase structure of unreduced Catalysts 15-18 are shown in FIG. 20. As in Example 5, spinel-like phases with characteristic diffraction peaks at 2θ of 30.7°, 36.8°, 44.4°, 59.8°, and 65.2° were observed in all samples. As Ni and Co content increased, increases in peak intensity were observed for the peaks of 2θ=41.5° and 61.2°, suggesting an increase in the amount of Ni—Mg—O solid solution and Co—Mg—O solid solution. Again, all the samples under calcination at 900° C. were well-crystallized. It can be also seen from the XRD patterns that the bulk phases of the catalysts were not altered significantly with varying Ni and Co content.

Figure 21:
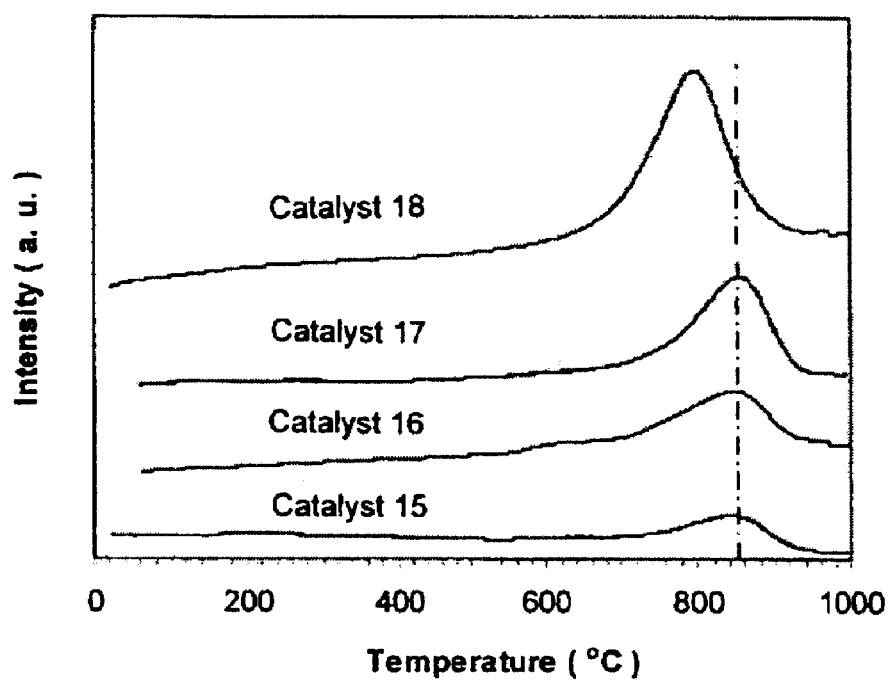
FIG. 21 is a graph showing TPR profiles of certain embodiments of the present invention.

TPR profiles indicating the reducibility of Catalysts 15-18 (unreduced calcine precipitates) are shown in FIG. 21. FIG. 21 shows a single broad reduction peak for all samples. As discussed in Example 5, after high temperature calcination, Ni and Co may exist in a complex structure leading to single-stage reduction with a broad peak. Such a structure may involve alloying of Ni and Co. Owing to the relatively low Ni—Co content, no reduction of separate Ni oxide or Co oxide was observed. Even for the highest Ni—Co content sample, Catalyst 18, no reduction of metal oxide was observed. This is consistent with the XRD analyses which did not show Ni and Co oxide phases. Catalyst 18 exhibited a lower temperature, broader reduction peak (650-900° C.) compared to Catalyst 15-18 having lower Co and Ni content. The shift of peak maximum to higher temperatures for the lower Ni—Co content samples may be ascribed to the increase of the metal-support interaction resulting from better dispersion of Ni and Co in the solid structures.

Figure 22:
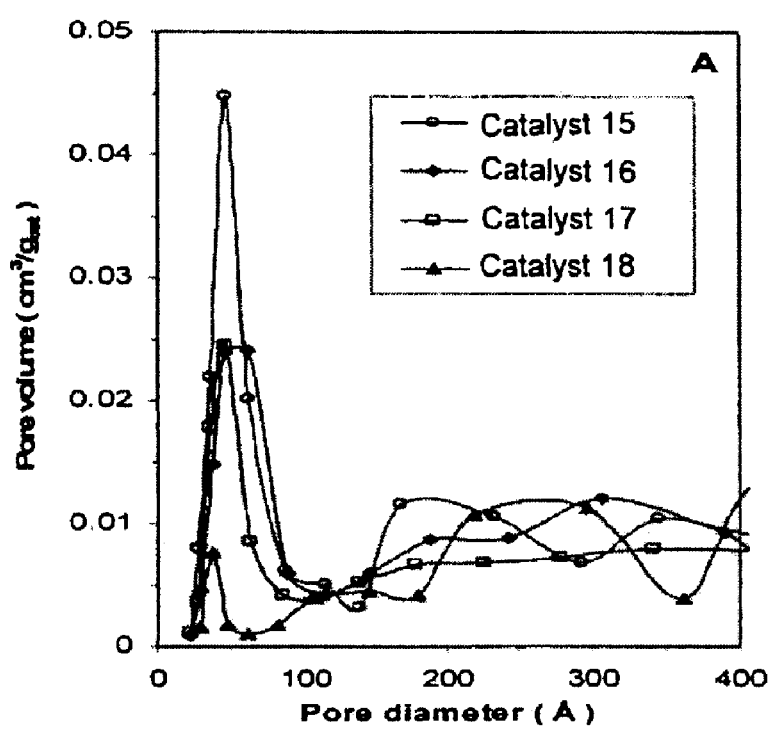
FIG. 22 is a graph showing pore size distribution of certain embodiments of the present invention.
Figure 23:
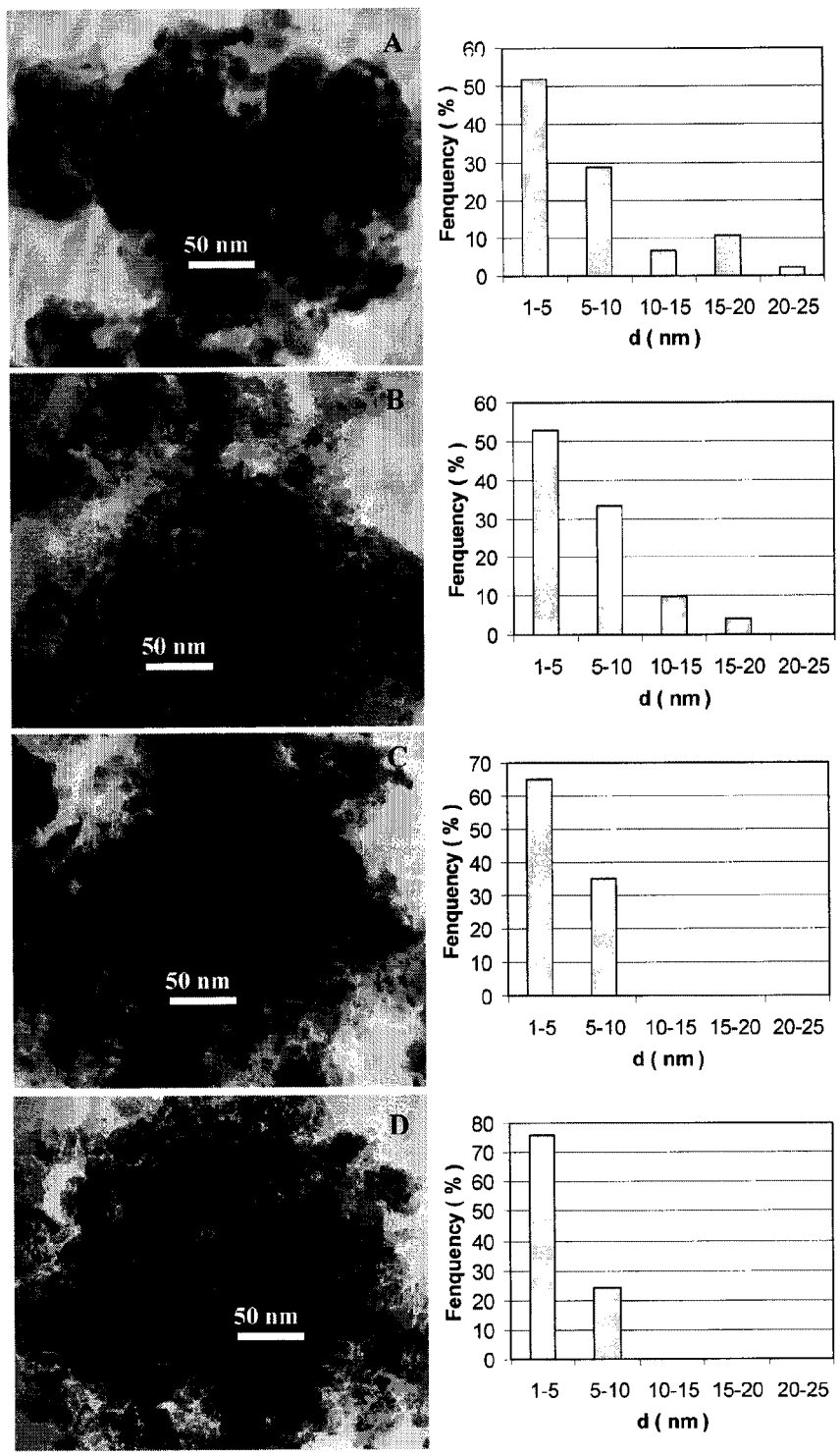
FIGS. 23(a) to (d) are pre-reaction TEM micrographs and particle size distribution graphs of certain embodiments of the present invention as defined in Example 7 of the following description, namely (a) Catalyst 18; (b) Catalyst 17; (c) Catalyst 16; and (d) Catalyst 15.

Pore size distributions of Catalysts 15-18 are shown in FIG. 22. Pore volume peaks with pores having a diameter of about 30 Å. As Ni—Co content increases, the small pores, typically having a diameter of less than 100 Å, drops significantly from about 0.045 cm³/$g_{cat}$ of Catalyst 15 to about 0.0075 cm³/$g_{cat}$ of Catalyst 18.

The metal particle morphology and size distribution were investigated using TEM and the results are shown in FIG. 23(a)-(d). It is evident that Catalyst 18 has the broadest distribution of metal particles with about 20% particles larger than 10 nm (FIG. 23(a)). As the Ni and Co content decreased, the amount of the large metal particles decreased significantly. All metal particles were smaller than 10 nm for Catalysts 15 and 16 (FIGS. 23(d) and (c)). The proportion of smaller metal particles was increased with the decrease in the Ni—Co content. From Catalyst 18 to Catalyst 15, the proportion portion of metal particles between 1 and 5 nm increased from 52% to 76%. Also, in the cases of Catalysts 15 and 16, the boundaries between metals and support became indistinct in comparison to the boundaries observed with higher Ni—Co content catalysts.

Figure 24:
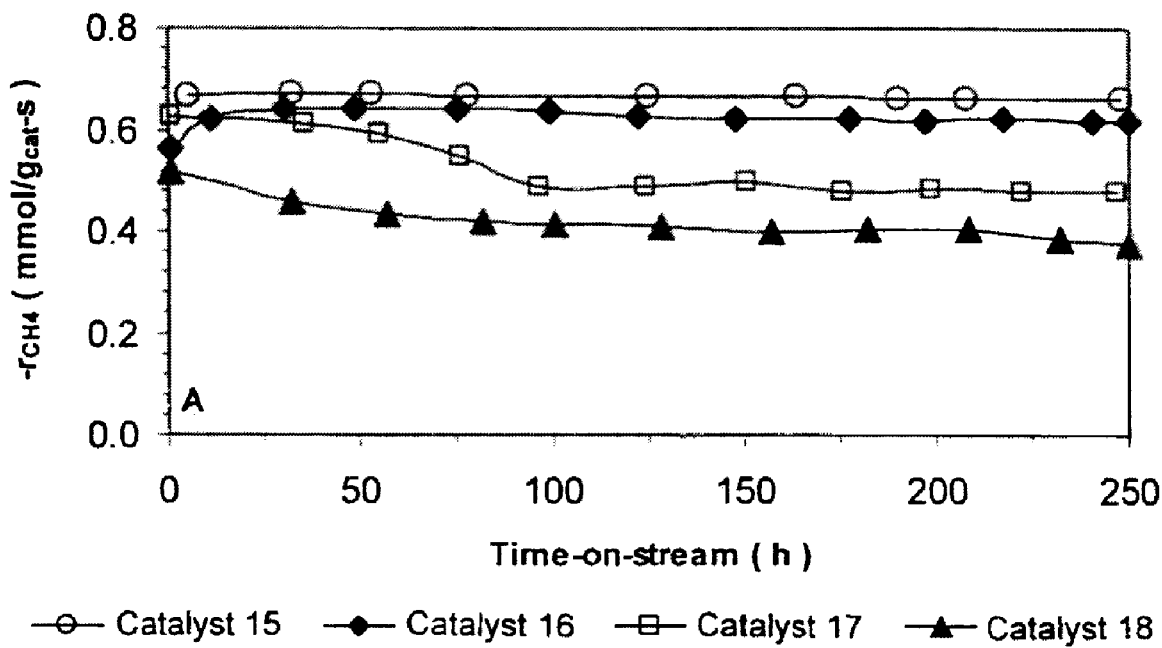
FIG. 24 is a graph showing CH$_4$ conversion as a function of TOS for a 250-h activity, and stability test of certain embodiments of the present invention.

Activity and stability of Catalysts 15-18 was investigated over a 250-h period. Samples were prepared by diluting 0.03 g of catalyst with 0.470 g quartz sand. Tests were run at 750° C., 1 atm, GHSV=180,000 mL/$g_{cat}$·h and $CH_4/CO_2/N_2$=1/1/1. Catalyst activity in terms of $CH_4$ conversion rate as function of TOS is shown in FIG. 24. Both activity and stability were inversely correlated to Co and Ni content.

No deactivation was observed for Catalyst 15 during the 250-h testing period. Catalyst 15 maintained a stable $CH_4$ conversion rate at about 0.680 mmol/$g_{cat}$-s. For Catalyst 16, the activity increased gradually with time in the first 30 h and then remained at a stable CH$_4$ conversion rate of about 0.621 mmol/g$_{cat}$-s. Increasing conversion rate during the initial period was ascribed to the formation of new active sites when the catalyst was exposed to the reaction mixture. Deactivation was observed for Catalysts 17 and 18. During the 250 h TOS, the conversion rates of CH$_4$ for Catalysts 17 and 18 dropped from 0.629 mmol/g$_{cat}$-s to 0.481 mmol/g$_{cat}$-s and from 0.516 mmol/g$_{cat}$-s to 0.376 mmol/g$_{cat}$-s, respectively.

Figure 25A:
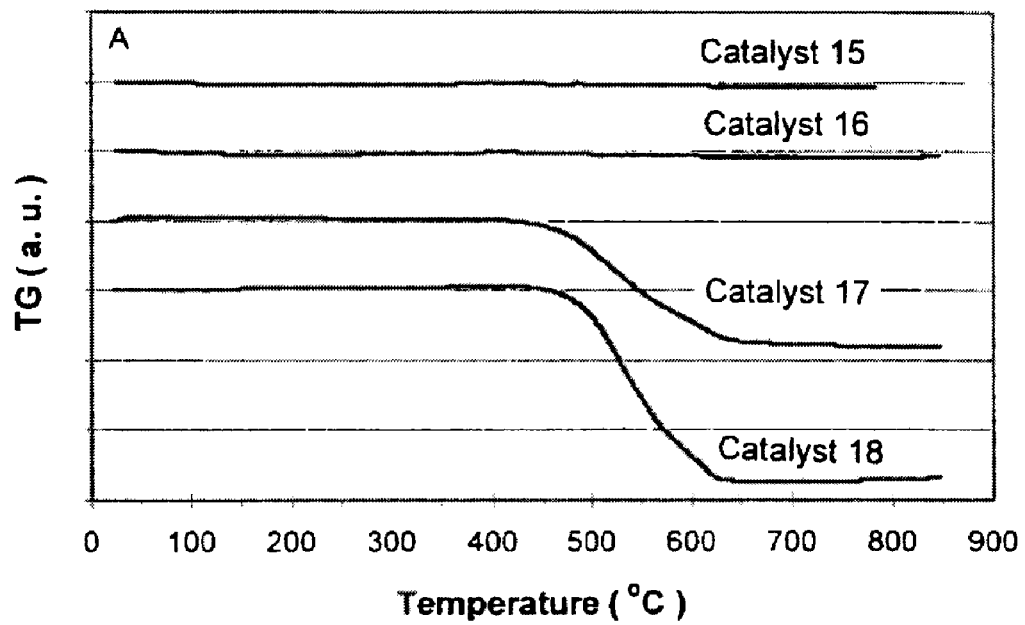
FIGS. 25(a) and (b) are graphs, for a 250-h activity and stability tests of certain embodiments of the present invention, showing: (a) TG profiles of spent catalysts; and (b) DTG profiles of spent catalysts.

TG and DTG analysis on the spent catalysts indicated that Catalysts 15 and 16 had no detectable carbon deposition while Catalysts 17 and 18 had carbon deposition of up to 0.30 and 0.46 g$_c$/g$_{cat}$, respectively (Table 8, FIGS. 25(a) and (b)). The very slight weight loss in Catalysts 15 and 16 occurring at around 100° C. (FIG. 25(a)) probably resulted from the evaporation of moisture. Carbon deposits on Catalysts 17 and 18 were oxidized at around 420-650° C. (FIGS. 25(a) and (b)). TEM analysis revealed no detectable carbon deposits on spent Catalysts 15 and 16 (FIGS. 26(c) and (d)), but clear filamentous carbon was found on spent Catalysts 17 and 18 (FIGS. 26(a) and (b)).

TABLE 8

Carbon deposition on Catalysts 15-18

| No. | Catalyst | Carbon deposition at 250 h (g$_c$/g$_{cat}$) |
| --- | --- | --- |
| 15 | Ni—Co | 0 |
| 16 | Ni—Co | 0 |
| 17 | Ni—Co | 0.300 |
| 18 | Ni—Co | 0.446 |

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within the spirit and scope of the invention.

The invention claimed is:

1. A nickel-cobalt bimetallic catalyst for production of synthesis gas by CO$_2$ reformation of hydrocarbon, the catalyst comprising a reduction product of a composite metal oxide having a chemical composition on an anhydrous basis after calcination expressed by the empirical formula:

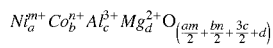

$$Ni_a^{m+} Co_b^{n+} Al_c^{3+} Mg_d^{2+} O_{(\frac{am}{2}+\frac{bn}{2}+\frac{3c}{2}+d)}$$

wherein m and n are the valences of Ni and Co respectively and equivalent to 2 or 3, a, b, c and d are mole fractions wherein a+b+c+d=1, and 0.001≦a≦0.8, 0.001≦b≦0.8, 0.1≦c≦0.99, and 0.01≦d≦0.99;

wherein the reduction product comprises active components comprising the metal form of Ni, Co, and/or their alloy.

2. A catalyst according to claim 1 wherein the catalyst has a Ni and Co combined particle size ≦10 nm.

3. A catalyst according to claim 2 wherein the catalyst has a Ni and Co combined dispersion of at least 5%.

4. A catalyst according to claim 3 wherein the catalyst has a Brunauer Emmett Teller (BET) specific area of at least 50 m$^2$/g.

5. A catalyst according to claim 4 wherein the catalyst has a porous volume of at least 0.050 cm$^3$/g.

6. A catalyst according to claim 5 wherein the catalyst has an average pore diameter no greater than 100 Å.

7. A process for preparing a catalyst according to claim 1 comprising the steps of:
(a) dissolving water soluble metal salts comprising inorganic or organic metal salts of Ni, Co, Mg, and Al;
(b) adding a basic solution of a precipitation reagent into an acidic solution of the metal salts of step (a) to generate a precipitate;
(c) washing the precipitate;
(d) drying the precipitate;
(e) calcining the precipitate; and
(f) activating the catalyst before reaction in a flow stream comprising H$_2$.

8. A process according to claim 7 wherein the metal salts comprise nickel nitrate, cobalt nitrate, magnesium nitrate and aluminium nitrate.

9. A process according to claim 8 wherein step (e) comprises calcining the precipitate in air for 2 to 20 hours at 300 to 1300° C.

10. A process according to claim 9 wherein step (f) comprises activating the catalyst for 0.5 to 50 hours at 200 to 1000° C.

11. A process according to claim 10 wherein the precipitation reagent comprises ammonia.

12. A process for producing synthesis gas using a catalyst according to claim 1 for reforming a hydrocarbon or biogas with an oxidant.

13. A process according to claim 12 wherein the hydrocarbon is selected from the group consisting of methane, natural gas, petroleum gas, naphtha, heavy oil, crude oil and their mixtures.

14. A process according to claim 13 wherein the oxidant is selected from the group consisting of steam, carbon oxide, carbon dioxide, oxygen and their mixtures.

15. A process according to claim 14 where the oxidant is carbon dioxide and the hydrocarbon is methane or natural gas.

16. A process according to claim 12 wherein the molar ratio between the oxidant and the hydrocarbon is in the range of 0.5 to 10.

17. A process according to claim 16 wherein gas hourly space velocity is 2,000 to 2,000,000 mL/g$_{cat}$•h.

18. A process according to claim 17 wherein reaction temperature is 300 to 1300° C.

19. A process according to claim 18 wherein reaction pressure is 0.1 to 20 atm.

20. A process according to claim 19 wherein the process is conducted in a fixed bed reactor or a fluidized bed reactor.

21. A process according to claim 12 wherein the hydrocarbon is methane, the oxidant is carbon dioxide, reaction temperature is 400 to 900° C., reaction pressure is about 1 atm, feed gas is CH$_4$/CO$_2$ at a 1:1 molar ratio and gas hourly space velocity is 2,000 to 2,000,000 mL/g$_{cat}$•h.

22. A catalyst according to claim 1 wherein 0.001≦a≦0.068 and 0.01≦b≦0.10.

23. A catalyst according to claim 1 wherein the composite metal oxide comprises spinel phases of combinations of Ni, Co, Al, Mg, and O.

24. A composite metal oxide of the catalyst according to claim 22.

* * * * *